(12) United States Patent
Wadley et al.

(10) Patent No.: US 10,025,933 B2
(45) Date of Patent: *Jul. 17, 2018

(54) SYSTEM FOR UTILIZING ONE OR MORE DATA SOURCES TO GENERATE A CUSTOMIZED SET OF OPERATIONS

(71) Applicant: Bank of America Corporation, Charlotte, NC (US)

(72) Inventors: Cameron Wadley, Waxhaw, NC (US); Jiyoung Choi, Chicago, IL (US); Hamid Dalglijli, Chicago, IL (US); Thomas H. Judge, Chicago, IL (US); Britton T. Farrell, Chicago, IL (US); Katherine Dintenfass, Lincoln, RI (US); Craig Terrill, Barrington Hills, IL (US); Susan Varghese, Atlanta, GA (US); Minh Vuong, Clovis, CA (US)

(73) Assignee: Bank of America Corporation, Charlotte, NC (US)

( * ) Notice: Subject to any disclaimer, the term of this patent is extended or adjusted under 35 U.S.C. 154(b) by 127 days.

This patent is subject to a terminal disclaimer.

(21) Appl. No.: 15/164,448

(22) Filed: May 25, 2016

(65) Prior Publication Data
US 2017/0344745 A1    Nov. 30, 2017

(51) Int. Cl.
*G06F 21/57* (2013.01)
*G06F 17/30* (2006.01)
*H04L 29/06* (2006.01)

(52) U.S. Cl.
CPC .......... *G06F 21/57* (2013.01); *G06F 17/3053* (2013.01); *G06F 17/30365* (2013.01); *G06F 17/30554* (2013.01); *G06F 17/30914* (2013.01); *H04L 63/10* (2013.01)

(58) Field of Classification Search
CPC ......... G06F 17/30554; G06F 17/30412; G06F 17/30477; G06F 17/30528; G06F 19/325; G06F 19/345
See application file for complete search history.

(56) References Cited

U.S. PATENT DOCUMENTS

| | | |
|---|---|---|
| 5,867,799 A | 2/1999 | Lang et al. |
| 7,069,259 B2 | 6/2006 | Horvitz et al. |
| 7,395,316 B2 | 7/2008 | Ostertag et al. |
| 7,694,135 B2 | 4/2010 | Rowan et al. |
| 7,698,190 B2 | 4/2010 | Penkalski et al. |
| 8,112,332 B1 | 2/2012 | Garcia |
| 8,214,899 B2 | 7/2012 | Chien |
| 8,234,194 B2 | 7/2012 | Mele et al. |
| 8,240,557 B2 | 8/2012 | Fernandes et al. |

(Continued)

*Primary Examiner* — Harunur Rashid
(74) *Attorney, Agent, or Firm* — Banner & Witcoff, Ltd.; Michael A. Springs

(57) ABSTRACT

Systems and computer-readable media are disclosed for utilizing one or more data sources to generate a set of operations. First data may be received from a first data source and second data may be received from a second data source. The first data and second data may be processed by conversion engines to generate a first set of common data and a second set of common data. These sets of common data may be locally stored. A processing engine may analyze these sets of common data to detect one or more predefined events. A set of operations associated with the detected predefined events may be generated. The set of operations may be transmitted to a user device.

14 Claims, 7 Drawing Sheets

(56) References Cited

U.S. PATENT DOCUMENTS

| | | |
|---|---|---|
| 8,352,881 B2 | 1/2013 | Champion et al. |
| 8,417,608 B2 | 4/2013 | Benefield et al. |
| 8,425,605 B2 | 4/2013 | Zielinski |
| 8,537,986 B1 | 9/2013 | Cantu, II |
| 8,596,528 B2 | 12/2013 | Fernandes et al. |
| 8,606,678 B2 | 12/2013 | Jackowitz et al. |
| 8,666,836 B2 | 3/2014 | Adams |
| 8,676,937 B2 | 3/2014 | Rapaport et al. |
| 8,725,605 B1 | 5/2014 | Plunkett |
| 8,862,512 B2 | 10/2014 | Joa et al. |
| 8,881,257 B2 | 11/2014 | Cha et al. |
| 9,049,259 B2 | 6/2015 | Rathod |
| 9,053,471 B2 | 6/2015 | Mages et al. |
| 9,081,580 B2 | 7/2015 | Gaffney et al. |
| 2010/0161379 A1 | 6/2010 | Bene et al. |
| 2010/0161467 A1 | 6/2010 | Ageenko et al. |
| 2013/0073473 A1 | 3/2013 | Heath |
| 2013/0159115 A1 | 6/2013 | Adams |
| 2013/0226813 A1 | 8/2013 | Voltz |
| 2013/0290198 A1 | 10/2013 | Vassil |
| 2014/0136619 A1* | 5/2014 | Hoberman ............... H04L 67/18 709/204 |
| 2014/0245207 A1* | 8/2014 | Poulin ................... G06F 3/0484 715/771 |
| 2014/0310142 A1 | 10/2014 | Mak |
| 2014/0344718 A1 | 11/2014 | Rapaport et al. |
| 2014/0379272 A1 | 12/2014 | Sathe |
| 2015/0142595 A1 | 5/2015 | Acuna-Rohter |
| 2015/0235179 A1 | 8/2015 | Schmidt et al. |
| 2017/0278053 A1* | 9/2017 | High .................. G06Q 30/0202 |

\* cited by examiner

SYSTEM FOR UTILIZING ONE OR MORE DATA SOURCES TO GENERATE A CUSTOMIZED SET OF OPERATIONS

CROSS-REFERENCE TO RELATED APPLICATIONS

This application is related to U.S. patent application Ser. No. 15/164,472, filed on May 25, 2016, and entitled "SYSTEM FOR UTILIZING ONE OR MORE DATA SOURCES TO GENERATE A CUSTOMIZED INTERFACE," U.S. patent application Ser. No. 15/164,501, filed on May 25, 2016, and entitled "SYSTEM FOR PROVIDING CONTEXTUALIZED SEARCH RESULTS OF HELP TOPICS," U.S. patent application Ser. No. 15/164,519, filed on May 25, 2016, and entitled "NETWORK OF TRUSTED USERS," and U.S. patent application Ser. No. 15/164,526, filed on May 25, 2016, and entitled "CONTEXTUALIZED USER RECAPTURE SYSTEM," which are hereby incorporated by reference herein in their entirety.

BACKGROUND

Organizations, such as corporate entities, educational institutions, government agencies, and/or other large enterprise organizations, may provide a large volume of various products and services to its users. Faced with such a large volume, users may become desensitized to these products and services, including products and services that may be indispensable for the user. Accordingly, it may be advantageous to mine for user data from a variety of data sources, and to use the mined data to generate a series to operations related to the products and services that are to be completed by the user.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to various systems and techniques that provide effective, efficient, and convenient ways of utilizing one or more databases to generate a customized set of operations. Aspects of the disclosure may relate to a system, including at least one processor, a communication interface, and memory storing computer-readable instructions that, when executed by the at least one processor, cause the system to determine, by an automated service initiation engine, that a combination of a first value of a first common data field and a second value of a second common data field is indicative of a predefined event, calculate, by the automated service initiation engine and based on one or more rules from a rules engine, a confidence level for the predefined event, determine, by the automated service initiation engine, whether the confidence level for the predefined event is above a threshold, generate, by the automated service initiation engine and responsive to a determination that the confidence level for the predefined event is above the threshold, a set of operations to be completed by a user, transmit, by the automated service initiation engine, the set of operations to a user device associated with the user, receive, by the automated service initiation engine and from the user device, a notification that the user has completed a first operation in the set of operations, generate, by the automated service initiation engine, an updated set of operations to be completed by the user, and transmit, by the automated service initiation engine, the set of operations to the user device associated with the user.

In one instance, the first common data field and the second common data field may have been flagged as trusted data fields by the rules engine. The first common data field may have been flagged as a trusted data field by the rules engine based on an analysis comprising assigning, by the rules engine, a preliminary score to the first common data field based on a first set of rules, calculating, by the rules engine, a first confidence level for the first common data field based on a second set of rules, determining, by the rules engine, whether the first confidence level is above a first threshold, and flagging, by the rules engine and responsive to determining that the first confidence level is above the first threshold, the first common data field as a trusted data field.

In one aspect of the disclosure, a first operation in the set of operations comprises a selectable Internet link to an online web portal.

In one aspect of the disclosure, the system may initiate, by a sourcing engine, a first real-time data feed with a first data source, initiate, by the sourcing engine, a second real-time data feed with a second data source, receive, by the sourcing engine, a first field name and the first value, wherein the first value is associated with the first field name from the first real-time data feed, and receive, by the sourcing engine, a second field name and the second value, wherein the second value is associated with the second field name from the second real-time data feed. The system may further send, by the sourcing engine, the first field name and the first value to a first conversion engine and send, by the sourcing engine, the second field name and the second value to a second conversion engine. The system may further map, by the first conversion engine, the first field name to the first common data field, populate, by the first conversion engine and based on mapping the first field name to the first common data field, the first common data field with the first value, map, by the second conversion engine, the second field name to the second common data field, and populate, by the second conversion engine and based on mapping the second field name to the second common data field, the second common data field with the second value.

Aspects of the disclosure may relate to a computer-assisted method of determining a set of operations to be transmitted to a user device, the computer-assisted method including determining, by an automated service initiation engine, that a combination of a first value of a first common data field and a second value of a second common data field is indicative of a predefined event, calculating, by the automated service initiation engine and based on one or more rules from a rules engine, a confidence level for the predefined event, determining, by the automated service initiation engine, whether the confidence level for the predefined event is above a threshold, generating, by the automated service initiation engine and responsive to a determination that the confidence level for the predefined event is above the threshold, a set of operations to be completed by a user, transmitting, by the automated service initiation engine, the set of operations to a user device associated with the user, receiving, by the automated service initiation engine and from the user device, a notification that the user has completed a first operation in the set of operations, generating, by the automated service initiation engine, an updated set of operations to be completed by the user, and transmitting, by the automated service initiation engine, the set of operations to the user device associated with the user.

Additional aspects of the disclosure may relate to one or more non-transitory computer-readable media storing instructions that, when executed by a computer system comprising at least one processor and memory, cause the computer system to determine, by an automated service initiation engine, that a combination of a first value of a first common data field and a second value of a second common data field is indicative of a predefined event, calculate, by the automated service initiation engine and based on one or more rules from a rules engine, a confidence level for the predefined event, determine, by the automated service initiation engine, whether the confidence level for the predefined event is above a threshold, generate, by the automated service initiation engine and responsive to a determination that the confidence level for the predefined event is above the threshold, a set of operations to be completed by a user, transmit, by the automated service initiation engine, the set of operations to a user device associated with the user, receive, by the automated service initiation engine and from the user device, a notification that the user has completed a first operation in the set of operations, generate, by the automated service initiation engine, an updated set of operations to be completed by the user, and transmit, by the automated service initiation engine, the set of operations to the user device associated with the user.

In one instance, the first common data field and the second common data field may have been flagged as trusted data fields by the rules engine. The first common data field may have been flagged as a trusted data field by the rules engine based on an analysis comprising assigning, by the rules engine, a preliminary score to the first common data field based on a first set of rules, calculating, by the rules engine, a first confidence level for the first common data field based on a second set of rules, determining, by the rules engine, whether the first confidence level is above a first threshold, and flagging, by the rules engine and responsive to determining that the first confidence level is above the first threshold, the first common data field as a trusted data field. In one aspect of the disclosure, a first operation in the set of operations comprises a selectable Internet link to an online web portal.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
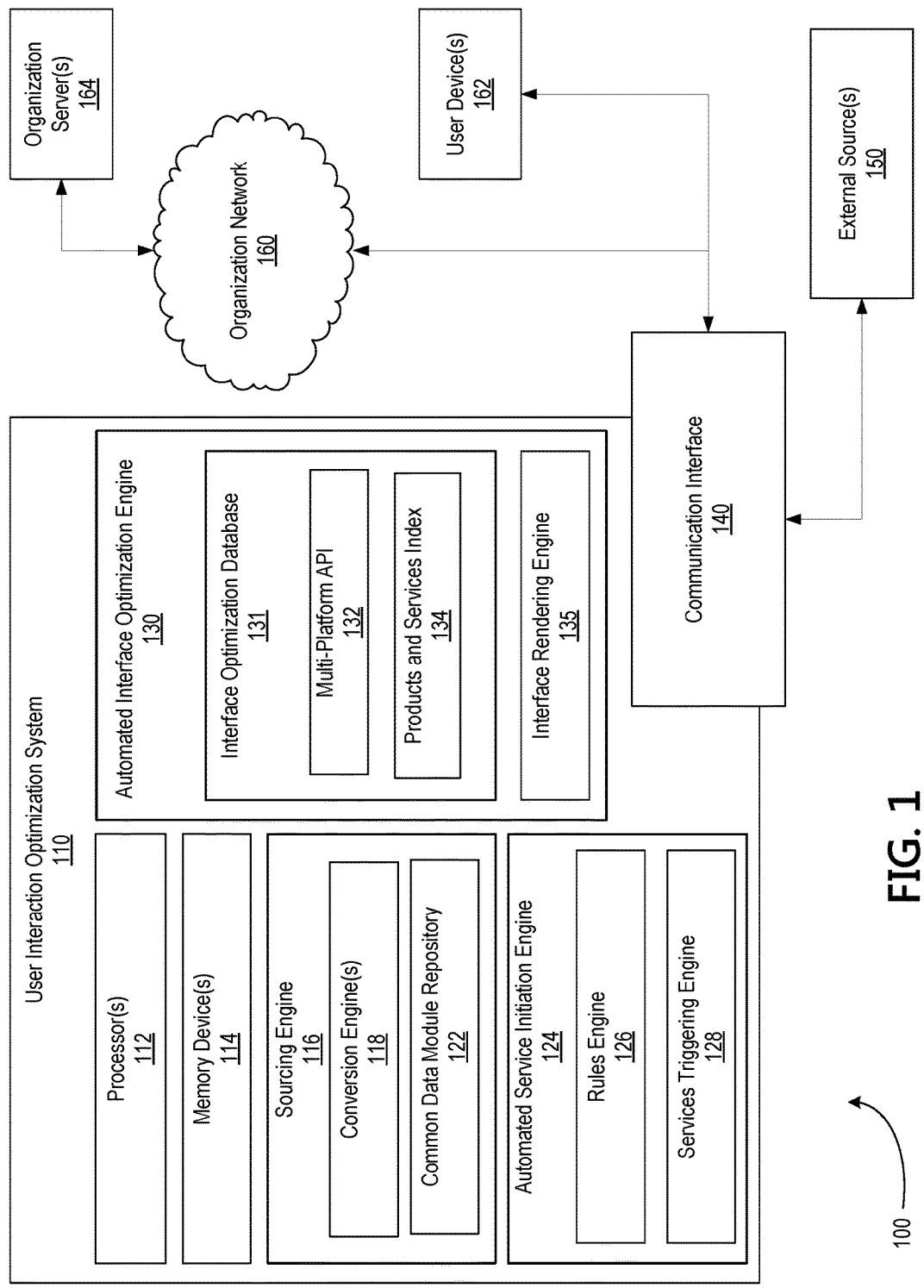
FIG. 1 depicts an illustrative an illustrative networked computing system for providing a set of operations and/or a set of products and services in accordance with one or more example embodiments.

FIG. 1 shows an illustrative networked computing system 100 for providing a set of operations and/or a set of products and services to one or more users. The networked computing system 100 may include one or more computing devices. For example, the networked computing system 100 may include a user interaction optimization system 110, and may be configured to communicate with one or more user device(s) 162, one or more organization database(s), one or more organization server(s) 164, and one or more external sources 150 (e.g., social media channels, user devices, and the like), according to one or more aspects of the present disclosure. The user interaction optimization system 110, described in further detail below may receive a request from a user device to access an online portal, retrieve a first set of services, analyze a first set of user engagement data for a user associated with the user device, wherein the first set of user engagement data is sourced from a plurality of data sources, determine a rank score for each service in the first set of services based on the analyzed first set of user engagement data, generate a second set of services based on the rank score for each service in the first set of services, transmit client-side instructions to display the second set of services on a user interface of the user device, receive a second set of user engagement data associated with the second set of services, and store the second set of user engagement data in a database. The user interaction optimization system 110 may also determine that a combination of a first value of a first common data field and a second value of a second common data field is indicative of a predefined event, calculate a confidence level for the predefined event, determine whether the confidence level for the predefined event is above a threshold, generate, responsive to a determination that the confidence level for the predefined event is above the threshold, a set of operations to be completed by a user, transmit the set of operations to a user device associated with the user, receive a notification that the user has completed a first operation in the set of operations, generate an updated set of operations to be completed by the user, and transmit the set of operations to the user device associated with the user.

The user devices 162 may be any type of computing device configured to provide the functionality described herein. For instance, the user device 162 may be a desktop computer, server computer, laptop computer, tablet computer, smartphone, wearable device, automated teller machine (ATM), or the like. In some examples, the user device 162 may be configured to receive and/or display a user interface, receive input via the user interface, and communicate the received input to one or more other computing devices. As such, the user device 162 may provide a user interface (e.g., a web browser, a desktop application, a mobile application, or the like) that enables the user to input data to, and receive data from, the user interaction optimization system 110. The user device 162 may, in some instances, be a special-purpose computing device configured to perform specific functions.

The user interaction optimization system 110 may acquire user-related data and/or the user device 162 utilized by a user to access an online portal from one or more internal systems (e.g., systems associated with and/or operated by the organization). In some examples, the internal systems may include the organization servers 164. The organization servers 164 may be any type of computing device configured to provide the functionality described herein. For instance, the organization server 164 may be a database server, a file server, a web server, an application server, or the like. In some examples, the organization server 164 may be configured to communicate with the user interaction optimization system 110 relating to information stored on the organization server 164. The organization server 164 may store, for example, information relating to one or more services offered by the organization, one or more applications by the organization, and/or one or more users associated with the organization. Further, the user interaction optimization system 110 may acquire user-related data and/or the user device 162 utilized by a user to access an online portal from one or more external sources 150. For example, the user interaction optimization system 110 may acquire information from various social media channels, fitness trackers, Internet of Things (IoT) devices, and so forth.

The networked computing system 100 may also include one or more networks, which may interconnect one or more of the user interaction optimization system 110, the user devices 162, the organization servers 164, and external sources 150. Thus, the user interaction optimization system 110 may be in signal communication with the user devices 162, the organization servers 164, and the external sources 150 via a network. The networks may include one or more of a wired network (e.g., the Internet, LAN, WAN, or the like), a wireless network (e.g., a cellular network, Bluetooth, NFC, or the like), or a combination of wired or wireless networks.

In some examples, the networked computing system 100 may include an organization network 160. The organization network 160 may include one or more sub-networks (e.g., LANs, WANS, or the like). The organization network 160 may be associated with a particular organization (e.g., a corporation, enterprise organization, educational institution, governmental institution, and the like) and may interconnect one or more computing devices associated with the organization. For example, the user interaction optimization system 110 and organization servers 164 may be associated with an organization (e.g., an enterprise organization), and an organization network 160 may be associated with and/or operated by the organization, and may include one or more networks (e.g., the Internet, LANs, WANs, VPNs, or the like) that interconnect the user interaction optimization system 110, organization servers 164, and one or more other computing devices and/or computer systems that are used by, operated by, and/or otherwise associated with the organization.

FIG. 1 also shows an example implementation of a user interaction optimization system 110. The user interaction optimization system 110 may include various components that facilitate various tasks, including receiving a request from a user device to access an online portal, retrieving a first set of services, analyzing a first set of user engagement data for a user associated with the user device, wherein the first set of user engagement data is sourced from a plurality of data sources, determining a rank score for each service in the first set of services based on the analyzed first set of user engagement data, generating a second set of services based on the rank score for each service in the first set of services, transmitting client-side instructions to display the second set of services on a user interface of the user device, receiving a second set of user engagement data associated with the second set of services, and storing the second set of user engagement data in a database. Additionally or alternatively, the user interaction optimization system 110 may include various components that further facilitate determining that a combination of a first value of a first common data field and a second value of a second common data field is indicative of a predefined event, calculating a confidence level for the predefined event, determining whether the confidence level for the predefined event is above a threshold, generating, responsive to a determination that the confidence level for the predefined event is above the threshold, a set of operations to be completed by a user, transmitting the set of operations to a user device associated with the user, receiving a notification that the user has completed a first operation in the set of operations, generating an updated set of operations to be completed by the user, and transmitting the set of operations to the user device associated with the user. It will be appreciated that the user interaction optimization system 110 illustrated in FIG. 1 is shown by way of example and that other implementations of a user interaction optimization system 110 may include additional or alternative components, modules, sub-modules, and so forth. In this example, the user interaction optimization system 110 includes one or more processors 112, one or more memory devices 114, a communication interface 140, a sourcing engine 116, an automated service initiation engine 124, and an automated interface optimization engine 130. Also in this example, automated interface optimization engine 130 includes interface optimization database 131 and interface rendering engine 135, wherein interface optimization database 131 may include multi-platform API 132 and products and services index 134. Thus, the user interaction optimization system 110 may be implemented using a special-purpose computing device (or computing devices) that have been specially programmed to perform functionality according to one or more aspects of the present disclosure.

The one or more processors 112 (e.g., microprocessor, microcontroller, and the like) of the user interaction optimization system 110 may operate by using an algorithm that facilitates receiving a request from a user device to access an online portal, retrieving a first set of services, analyzing a first set of user engagement data for a user associated with the user device, wherein the first set of user engagement data is sourced from a plurality of data sources, determining a rank score for each service in the first set of services based on the analyzed first set of user engagement data, generating a second set of services based on the rank score for each service in the first set of services, transmitting client-side instructions to display the second set of services on a user interface of the user device, receiving a second set of user engagement data associated with the second set of services, and storing the second set of user engagement data in a database. Additionally or alternatively, the one or more processors 112 may operate by using an algorithm that facilitates determining that a combination of a first value of a first common data field and a second value of a second common data field is indicative of a predefined event, calculating a confidence level for the predefined event, determining whether the confidence level for the predefined event is above a threshold, generating, responsive to a determination that the confidence level for the predefined event is above the threshold, a set of operations to be completed by a user, transmitting the set of operations to a user device associated with the user, receiving a notification that the user has completed a first operation in the set of operations, generating an updated set of operations to be completed by the user, and transmitting the set of operations to the user device associated with the user. These algorithms may be included as instructions stored in the one or more memory devices 114 and may be included as a portion of the sourcing engine 116, the automated service initiation engine 124, and/or the automated interface optimization engine 130. Additionally, the one or more processors 112 may operate by receiving information from the one or more external sources 150. Illustrative algorithms will be described below with reference to FIGS. 2 and 4-6.

In this example, the one or more processors 112 may be configured to operate the sourcing engine 116, the automated service initiation engine 124, and/or the automated interface optimization engine 130 using an operating system (e.g., a proprietary operating system, an open source operating system, an embedded operating system, and/or the like). In some cases, the one or more memory devices 114 may be communicatively coupled to the one or more processors 112, such as via a data bus. The one or more memory devices 114 may be used to store any desired information, such as the aforementioned algorithm, a lookup table, computer-executable instructions to implement the generation of a set of operations, a set of products and services, and/or the like. The one or more memory devices 114 may be any suitable storage, including, but not limited to RAM, ROM, EPROM, flash memory, a hard drive, and so forth. In some examples, the one or more processors 112 may store information within and/or may retrieve information from the one or more memory devices 114.

The communication interface 140 of the user interaction optimization system 110 may facilitate communication between the user interaction optimization system 110, the external sources 150, the user device 162, and/or the organization servers 164 via a network using one or more wired or wireless communication links. In some examples, the user interaction optimization system 110 may include one or more computing devices that may be communicatively coupled to a network. The network may be communicatively coupled to one or more devices, such as to servers associated with the external sources 150, the user device 162, and/or the organization servers 164. The network may include one or more wired and/or wireless networks, such as a telecommunications network (e.g., a cellular network, a land line network, a cable network, and the like), a Wi-Fi network, a local area network (LAN), a wide area network (WAN), the Internet, and the like. When used in a LAN networking environment, the user interaction optimization system 110 may include a modem and/or other means for establishing wired and/or wireless communication over the WAN, such as the Internet. It will be appreciated that the network connections discussed herein are illustrative and other means of establishing communication links between the user interaction optimization system 110, the external sources 150, the user device 162, and/or the organization servers 164 may include one or more various protocols such as TCP/IP, Ethernet, FTP, HTTP, and so forth.

The sourcing engine 116 (discussed in detail below in reference to FIGS. 2 and 3) may include conversion engine(s) 118 and common data module repository 122. The sourcing engine 116 may receive user-related data from one or more internal and/or external data sources. Conversion engine(s) 118 may convert the received user-related data into a common format and store the converted data in common data module repository 122. Sourcing engine 301 may transmit the converted data to multi-platform API 132. Automated service initiation engine 124 may include rules engine 126 and services triggering engine 128. Automated service initiation engine 124 may analyze the user-related data stored in common data module repository 122 using rules engine 126. For example, automated service initiation engine 124 may utilize rules engine 126 to determine if data stored in common data module repository 122 is a trusted data value, or whether one or more data elements stored in common data module repository 122 are indicative of a predefined event. If a predefined event is detected, services triggering engine 128 may send a set of operations to be completed to a user. Predefined events detected by automated service initiation engine 124 may further be accessed by multi-platform API 132.

The interface optimization database 131 of the automated interface optimization engine 130 may be used to store information related to products and services and users (e.g., users of the organization's services). A list of products and services offered by the enterprise may be stored in products and services index 134. For example, the products and services index 134 may be used to store information related to the products and services offered by the organizations. Further, the interface optimization database 131 may be used to store information related to user behavior determined by tracking/monitoring a user's activity while interacting with the organization's services. In some examples, the interface optimization database 131 may receive the user engagement data via multi-platform API 132 and/or sourcing engine 301. Various systems in the organization's network may have access (e.g., read access, read/write access, and the like) to the multi-platform API 132. As such, the user engagement data collected and stored by the automated interface optimization engine 130 may be available for use across all channels and services offered by the organization.

The products and services index 132 may store information associated with one or more products and services maintained by the organization, e.g., a product and service ID, a title (e.g., text, graphics, audio, video, mixed media, and the like), a type, contents, one or more categories/subjects, one or more meta tags, a date created, an author, a length (e.g., a number of characters in the content, a file size, an average page load time, and the like), a user popularity rating, a click-through rating (e.g., a ratio of the number of users that clicked on a particular product or service when it is included in a user interface presented to the user, over the number of users for whom the particular product or service was displayed), and so forth. In some examples, the products and services index 134 may additionally maintain a hierarchical tree of the categories. As such, the products and services index 134 may differentiate products and services associated with high-level categories (e.g., more general products and services) from products and services associated with low-level categories (e.g., more specific products and services). For instance, an example high-level category may be Banking, and an example low-level category may be Personal Credit Cards. Further, the products and services index 134 may associate one or more meta tags to a product and service, where the meta tags may be unique terms that appear in the content of a product and service. In some examples, some or all of the meta tags associated with a product and service may be the same as some or all of the categories/subjects associated with the product and service. In examples where a product and service is assigned one or more meta tags, the user interaction optimization system 110 may retrieve the initial set of products and services from the products and services index 134 by matching a set of search terms provided by the user with the meta tags. As such, some or all of the products and services associated with meta tags matching one or more of the search terms will be added to the initial set of products and services. It will be appreciated that one or more of these fields may be designated as mandatory or optional in some example implementations of a user interaction optimization system 110.

The interface optimization database 131 may further store information related to a current or previous users' interactions with the organization's products or services. The user engagement metrics database 134 may track information relating to interactions via various channels, including mobile devices, desktops, laptops, ATMs, wearable devices, and so forth. As such, the interface optimization database 131 may track information relating to users accessing an organization's services via a mobile application, a mobile browser, a desktop application, a desktop browser, a wearable device application, and so forth. In some examples, the interface optimization database 131 may store metrics associated with a user's interaction with some or all pages associated with the organization. In other examples, the interface optimization database 131 may store metrics associated with a user's interaction with some or all products and services provided by the organization. Further, the interface optimization database 131 may store metrics associated with a specific page and/or product and service, as well as aggregate metrics associated with a plurality of pages or products and services. For instance, the interface optimization database 131 may store a user ID, a username, browser(s) used to access organization's services, language(s) used to access organization's services, computing device(s) used to access organization's services (e.g., a smartphone, a laptop, a tablet, a wearable device, and so forth), screen resolution(s) used to access organization's services, location(s) (e.g., an address, a coordinate, or a generic description, such as coffee shop or home, and so forth) and/or IP address(es) from which organization's services were accessed, network speed(s), a number of times the user has accessed a particular page, a number of times the user accesses the same pages from different devices, the date(s) and time(s) at which the user accessed pages, the page(s) which the user has accessed, the referring page(s) (e.g., the pages the user was on before coming to the current page), product and service(s) (e.g., product and service ID(s)) previously viewed by the user, average number of product and service(s) viewed/clicked in a session), average time spent on a page, average time spent reading information associated with a product and service, minimum/average/maximum number of concurrent tabs accessing the organization's services, minimum/average/maximum time spent on page(s), number of single-page visits, time elapsed since last interaction with the current page, and so forth. Additionally, in some cases, some or all user engagement metrics stored in the interface optimization database 131 may be associated with one or more predefined events identified by the automated interface optimization engine 130. Further, in some examples, the interface optimization database 131 may maintain historical values of user engagement data (e.g., user engagement with products and services, such as types of products and services recently and/or typically viewed by the user, types of products and services recently and/or typically viewed by similar users, and the like) for a plurality of users, such that the user interaction optimization system 110 may provide more relevant subset of products and services to a user based on this historical data. As such, the automated interface optimization engine 130 may collect and store user engagement metrics (e.g., historical user engagement metrics) related to a user's engagement with the products and services displayed in response to the user accessing the online portal to view such products and services, such that the engagement metrics may be used by the automated interface optimization engine 130 to determine which products and services to display for subsequent users. The historical user engagement metrics may be stored in the interface optimization database 131. For instance, the automated interface optimization engine 130 may use predictive analytics techniques to learn from the historical user engagement metrics maintained in the interface optimization database 131. In particular, the automated interface optimization engine 130 may analyze the historical user engagement data associated with previously rendered products and services for previous users to make predictions about which products and services were more successful at engaging users with similar recent or upcoming life events and/or user engagement metrics as the current user. Further, the automated interface optimization engine 130 may be configured to analyze the historical use engagement metrics to detect patterns in the data. As such, the automated interface optimization engine 130 may generate one or more rules to reflect the detected patterns in the historical user engagement metrics.

Figure 2:
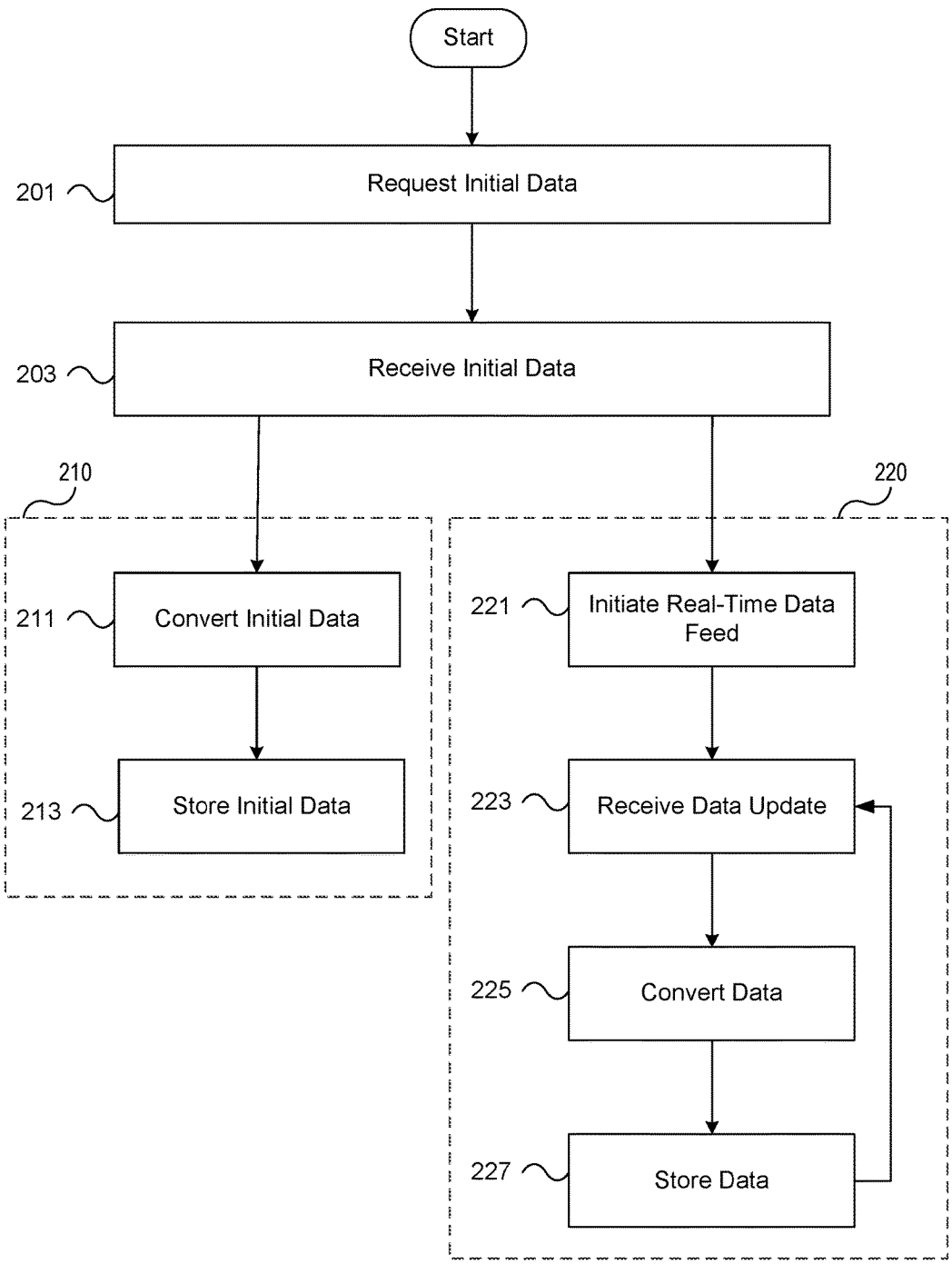
FIG. 2 depicts an illustrative method for sourcing user-related data in accordance with one or more aspects described herein.

FIG. 2 depicts an illustrative method for sourcing user-related data that may be utilized by sourcing engine 301. Sourcing engine 301 may be maintained by an enterprise. The illustrative sourcing method may be executed separately for each user of the enterprise. Alternatively, the illustrative sourcing method may be executed in batch mode, wherein each step is simultaneously performed for multiple users. At step 201, a sourcing engine 301 (discussed below in reference to FIG. 3) may request initial data for a first user from one or more data source. Sourcing engine 301 may include an authentication token in the request for initial data. The contents of the authentication token may vary depending on the type of authentication required by the data source to which the request for data is sent.

Sourcing engine 301 may request data from multiple sources of data. For example, sourcing engine 301 may transmit a first request for data associated with the first user to a first source of data and a second request for data associated with the first user to a second source of data. Sourcing engine 301 may transmit the first request and the second request in parallel or sequentially. The first request and the second request is for illustrative purposes, and a greater number of requests or a fewer number of requests may be transmitted by sourcing engine 301 depending on the number of data sources available for the first user.

The sources of data may be internal (e.g., maintained by the enterprise) or external (e.g., not maintained by the enterprise). External data sources may include, but are not limited to, social media websites, and wearable and/or Internet of Things devices (smartphone, smartwatch, fitness trackers, and the like). Sourcing engine 301 may generate independent initial requests for data for each data source, such that an request for initial data sent to a data source is properly customized and formatted for that data source.

In a first instance, sourcing engine 301 may send a first request for initial data for a first user to a first data source at step 201. The first data source may be an external data source. The first data source may be a first social media website. The first social media website may allow users to create a user profile. Users of the first social media website may then connect to other users, share posts, photos, videos, and news stories, exchange private messages, and join various groups. Sourcing engine 301 may send the first initial request data to a first application programming interface (API) provided by the first social media website. The first API may be a HTTP-based API that may be used to query data from the first social networking website. The first API may include nodes, edges, and fields. The nodes may represent elements of the first social networking website, such as a user or a photo. The edges may represent connections between the nodes, such as comments made on a photo. The fields may represent information about the nodes, such as a user's birthday or gender. The sourcing engine 301 may include access tokens in the first request for initial data. The specific access tokens in the first request for initial data may vary on the type of data that is requested.

The nodes, fields, and edges in the first API may be read with an HTTP "Get" request. The first request for initial data made to the first data source sent by sourcing engine 301 may include a data field identifying the user for which the data is requested. The sourcing engine 301 may further include specific fields or edges within the first request for initial data. For example, sourcing engine 301 may request one or more of the first user's ID, age, biography, birthday, a list of iOS and Android devices the user is using, education, email address, name, gender, hometown, locale, relationship status, significant other, updated time, website, work experience, and the like. In certain instances, the first user may have configured privacy or permission settings within the first social networking website such as one or more of these fields or edges is not accessible to sourcing engine 301 via the first API.

Continuing with the first instance, sourcing engine 301 may further send a second request for initial data for the first user to a second data source at step 201. The second data source may be an external data source. The second request for initial data may be transmitted prior to, simultaneous to, or subsequent to the first request for initial data. The second data source may be a second social media website. The second social media website may allow users to create a user profile. Users of the second social media website may then send and read messages. A first user of the second social media website may subscribe or follow other users, such that messages posted by the other users can be viewed by the first user.

Sourcing engine 301 may send the second request for initial data to a second API provided by the second social media website. The second API may be a HTTP-based API that may be used to query data from the second social networking website. The second API may be comprised of objects, including, but not limited to, users, messages, entities, and places. Users may be individuals or units that have created a user profile within the second social media website. Messages may be the messages that are posted or shared by users of the second social media website. Places may be locations with geographical coordinates that may be associated with a message (e.g., a message may be posted from a place) or the subject of a message (e.g., a message may be posted about a place). Entities may provide metadata and additional contextual information about content posted on the second social media website. The sourcing engine 301 may include access tokens in the second request for initial data. The specific access tokens in the second request for initial data may vary on the type of data that is requested.

The objects in the second API may be read with an HTTP "Get" request. Each of the objects may have one or more fields. These fields may also be read by sourcing engine 301 via an HTTP "Get" request. For example, regarding a "user" object, sourcing engine 301 may request data for fields including, but not limited to, the date the user's account with the second social media website was created, a user-provided description of the user's account, the accounts being followed by the user, the number of followers of the user's account, whether the user has enabled geotagging of messages, the user's ID, the location associated with the user's account, a user-provided name, a time zone the user declares themselves in, a URL provided by the user in association with their profile, and the like. The second request for initial data sent by sourcing engine 301 to the second data source may include a data field identifying the user for which the data is requested. The sourcing engine 301 may further include objects and fields within the second request for initial data. In certain instances, the first user may have configured privacy or permission settings within the second social networking website such as one or more of these objects or fields are not accessible to sourcing engine 301 via the second API.

Continuing with the first instance, sourcing engine 301 may further send a third request for initial data for the first user to a third data source at step 201. The third data source may be an external data source. The third request for initial data may be transmitted prior to, simultaneous to, or subsequent to, one or more of the first request for initial data and the second request for initial data. The third data source may be a third social media website. The third social media website may allow users to create a user profile. The user profile may be directed to the education history of the user, the career history of the user, the user's current employment information, and the user's skills. Users of the third social media website may connect with other users and may further exchange messages with other users.

Sourcing engine 301 may send the third request for initial data to a third API provided by the third social media website. The third API may be a HTTP-based API that may be used to query data from the third social networking website. Sourcing engine 301 may access, via the third API and for a user of the third social media website, basic profile fields, location fields, and position fields. Basic profile fields for a user of the third social media website may include, but are not limited to, the user's name, physical location, the industry the user belongs to, the most recent item the member has shared on the third social media website, the number of connections the user has on the third social media website, a summary of the user's professional profile, a summary of the user's specialties, the user's current position, and the user's email address. Location fields for a user of the third social media website may include, but are not limited to, a generic user-provided description of the user's location, and a country code representing the user's current country. Position fields for a user of the third social media website may include, but are not limited to, the title of the user's employment position, a summary of the employment position, a date indicating when the employment position began, a date indicating when the employment position ended, a Boolean value indicating whether the user is currently in this employment position, and a description of the company the employment position belongs to.

Continuing with the first instance, sourcing engine 301 may further send a fourth request for initial data to one or more databases. The one or more databases may be internal data sources. The one or more databases may store information associated with the first user. The information associated with the first user may include tracking or logging data from the first user's interactions with one or more online portals and/or web applications maintained by the enterprise. The first user may interact with the online portals and/or web applications maintained by the enterprise via one or more computing devices. For example, the enterprise may provide a online portal to its users. The online portal may provide information associated with the user's account(s) with the enterprise. For example, the user may have a checking account and a savings account with the enterprise. The online portal presented to the user may include information on the user's checking account and savings account. The online portal may further provide information on other products and services provided by the enterprise. For example, the online portal may include information on the types of brokerage accounts offered by the enterprise (even though the user may not currently have a brokerage account with the enterprise).

The user's interaction with the online portal may be tracked and logged. For example, if the user expresses an interest in brokerage accounts offered by the enterprise (by clicking on a brokerage account link presented in the online portal), that information may be tracked and logged by the online portal. In another example, if the user updates account information via the online portal, the updated information may be tracked and logged by the online portal. The user's interaction with the online portal may be tracked across multiple platforms. For example, the user may log onto the online portal from a first computing device, such as a laptop device. The user may further log onto the online portal from a second computing device, such as a cellular device. The online portal may track the user's interaction with the online portal via both the first computing device and the second computing device. The user's tracking information from the first computing device may be tagged with an identifier identifying the first computing device prior to storage. Similarly, the user's tracking information from the second computing device may be tagged with an identifier identifying the second computing device prior to storage. All tracking information from the online portal may be logged (e.g., stored) within one or more internal databases maintained by the enterprise. Sourcing engine 301 may send the fourth request for initial data to the one or more databases that stores the logged information for that user.

In a second instance, sourcing engine 301 may, at step 201, send batch or bulk initial requests for data to the one or more of the four data sources discussed above in reference to the first instance. That is, in the second instance, sourcing engine 301 may sent a first batch request to the first data source (e.g., the first social media website). The first batch request may be viewed as a plurality of initial requests for data included in a single batch request for initial data. That is, the first batch request may include a first request for initial data for a first user and a second request for initial data for a second user. Sourcing engine 301 may similarly send a second batch request to the second data source (e.g., the second social media website), a third batch request to the third data source (e.g., the third social media website), and a fourth batch request to the fourth data source (e.g., the one or more internal databases). The first, second, third, and fourth batch requests may be transmitted in parallel or sequentially.

At step 203, sourcing engine 301 may receive a set of initial data in response to the requests for initial data transmitted at step 201. Sourcing engine 301 may receive multiple sets of initial data. Each set of initial data may be received from a different data source.

Continuing with the first instance, sourcing engine 301 may receive a first set of initial data from the first data source to which sourcing engine 301 sent a first request for initial data (e.g., the first social media website). Sourcing engine 301 may receive a second set of initial data from the second data source to which sourcing engine 301 sent a second request for initial data (e.g., the second social media website). Sourcing engine 301 may receive a third set of initial data from the third data source to which sourcing engine 301 sent a third request for initial data (e.g., the third social media website). Sourcing engine 301 may receive a fourth set of initial data from the fourth data source to which sourcing engine 301 sent the fourth request for initial data. Sourcing engine 301 may tag each set of initial data with the data source that sent that set of initial data. Sourcing engine 301 may determine the data source that sent a set of initial data based on the contents of the initial data (e.g., the contents themselves may indicate the data source) or based on the address from which the set of initial data was received.

Continuing with the second instance, sourcing engine 301 may receive a first batch set of initial data from the first data source to which sourcing engine 301 sent a first batch request for initial data (e.g., the first social media website). Sourcing engine 301 may receive a second batch set of initial data from the second data source to which sourcing engine 301 sent a second batch request for initial data (e.g., the second social media website). Sourcing engine 301 may receive a third batch set of initial data from the third data source to which sourcing engine 301 sent a third request for initial data (e.g., the third social media website). Sourcing engine 301 may receive a fourth batch set of initial data from the fourth data source to which sourcing engine 301 sent a fourth request for initial data (e.g., the one or more internal databases). Sourcing engine 301 may tag each batch set of initial data with the data source that sent that set of initial data. Sourcing engine 301 may determine the data source that sent a batch set of initial data based on the contents of the batch set of initial data (e.g., the contents themselves may indicate the data source) or based on the address from which the batch set of initial data was received.

Processing may then proceed to modules 210 and 220. Sourcing engine 301 may execute modules 210 and 220 in parallel or sequentially. At step 211, sourcing engine 301 may convert the initial data received at step 203 into a common format. As noted above, the initial requests for data transmitted by sourcing engine 301 may be directed to different data sources, and the initial sets of data received by sourcing engine 301 may be from different data sources. Therefore, the sets of initial data may each be formatted differently, depending on the data source from which the set of initial data was transmitted.

A different conversion engine (described below in reference to FIG. 3) may be used for each data source. That is, a set of initial data from a first data source may be converted to the common format via a first conversion engine 311, whereas a set of initial data from a second data source may be converted to the common format via second conversion engine 312. Sourcing engine 301 may analyze the tag assigned to each set of initial data at step 203. Depending on the contents of the tag, sourcing engine 301 may then transmit that set of initial data to the appropriate conversion engine.

Continuing with the first instance, based on the contents of the tag of the first set of initial data, sourcing engine 301 may transmit the first set of initial data to a first conversion engine 311. Prior to transmitting the first set of initial data to the first conversion engine 311, sourcing engine 301 may set a flag indicating that the first set of initial data corresponds to the first user. Based on the contents of the tag of the second set of initial data, sourcing engine 301 may transmit the second set of initial data to a second conversion engine 312. Prior to transmitting the second set of initial data to the second conversion engine 312, sourcing engine 301 may set a flag indicating that the second set of initial data corresponds to the first user. Based on the contents of the tag of the third set of initial data, sourcing engine 301 may transmit the third set of initial data to the third conversion engine 313. Prior to transmitting the third set of initial data to the third conversion engine 313, sourcing engine 301 may set a flag indicating that the third set of initial data corresponds to the first user. Based on the contents of the tag of the fourth set of initial data, sourcing engine 301 may transmit the fourth set of initial data to a fourth conversion engine 314. Prior to transmitting the fourth set of initial data to the fourth conversion engine 314, sourcing engine 301 may set a flag indicating that the fourth set of initial data corresponds to the first user. Similarly, continuing with the second instance, based on the contents of the tag for the first batch set of initial data, second batch set of initial data, third batch set of initial data, and fourth batch set of initial data, sourcing engine 301 may send the first batch, second batch, third batch, and fourth batch to the first conversion engine 311, second conversion engine 312, third conversion engine 313, and fourth conversion engine 314, respectively. The transmittal of the first batch set of initial data to the first conversion engine 311 may include a flag indicating that the first batch set corresponds to a first set of users. The transmittal of the second batch set of initial data to the second conversion engine 312 may include a flag indicating that the second batch set corresponds to a second set of users. The transmittal of the third batch set of initial data to the third conversion engine 313 may include a flag indicating that the third batch set corresponds to a third set of users. The transmittal of the fourth batch set of initial data to the fourth conversion engine 314 may include a flag indicating that the fourth batch set corresponds to a fourth set of users. The first, second, third, and fourth set of users may include the same users or different users. Each conversion engine may then convert the inputted set of initial data or the inputted batch set of initial data to the common format (discussed below in reference to FIG. 3). At step 213, the converted data from each conversion engine may be stored within a common data module repository 320 (discussed below in reference to FIG. 3).

At step 221 of module 220, sourcing engine 301 may initiate real-time or near real-time data feed from each data source. Once sourcing engine 301 has received a set of initial data for a select user from a select data source, sending repeated requests for data for the select user to the select data source is inefficient and duplicative. That is, if the select user has not updated their user profile at the select data source or had any activity at the select data source, there is no new data for the select user at the select data source. Accordingly, configuring the sourcing engine 301 to send repeated requests for data for the select user for the select data source will result in no data being returned from the select data source. Accordingly, it may be advantageous to initiate a real-time or near real-time data feed for the select user from the select data source. In this configuration, if the select user updates their profile at the select data source or if there is any activity within the select user's account at the select data source (for example, continuing with the first instance, if the select user changes a relationship status at the first social media website, or posts a message on the second social media website, or updates an employment status at the second social media website), the select data source will automatically send a set of updated data to the sourcing engine 301.

Continuing with the first instance, sourcing engine 301 may initiate a first real-time or near real-time data feed for the first user at the first data source (e.g., at the first social media website). Sourcing engine 301 may configure the first real-time or near real-time data feed for the first data source via the first API provided by the first data source. Sourcing engine 301 may provide the first API with a first callback URL. Sourcing engine 301 may further provide the first data source with a list of objects and fields to monitor. When there is a change in any of the objects or fields designated by sourcing engine 301, the first data source will automatically send an update to the first callback URL. The update from the first data source may include an indication of the object type that the update relates to, the list of changes, an array of the fields that have changed to trigger the update, and a timestamp indicating when the update was sent. Sourcing engine 301 may further initiate a second real-time or near real-time data feed for the first user at the second data source (e.g., at the second social media website). Sourcing engine 301 may initiate the second real-time or near real-time data feed for the first user at the second data source via a streaming API provided by the second data source. The streaming API may be the same as or different than the second API provided by the second data source (discussed above in reference to step 201). Sourcing engine 301 may initiate the second real-time or near real-time data feed via the streaming API using a "Get" HTTP command specifying the user and the types of updates requested (for example, sourcing engine 301 may select to receive information for just the first user or to also receive messages from accounts the first user follows). Sourcing engine 301 may initiate a third real-time or near real-time data feed from the third data source for the first user. Sourcing engine 301 may integrate with a library provided by the third data source. The library may provide APIs for different real-time data change streams, and sourcing engine 301 may select the API that corresponds to the data stream that sourcing engine 301 requires updates from. Sourcing engine 301 may initial a fourth real-time or near real-time data feed from the fourth data source for the first user. Sourcing engine 301 may configure the fourth real-time or near real-time data feed via direct communication with the one or more databases on which the information from the online portal is logged. Alternatively, sourcing engine 301 may configure the fourth real-time or near real-time data feed via communication with one or more servers or computing devices provided by the enterprise.

At step 223, sourcing engine 301 may receive one or more updates from any of the four real-time or near real-time data feeds established at step 221. Sourcing engine 301 may tag each of the received updates with the data source that that update was received from. Sourcing engine 301 may determine the data source that sent each update by examining the contents of the update itself or by analyzing the address that the update was sent from. Sourcing engine 301 may further tag the update with a tag indicating the user with which the update is associated. Sourcing engine 301 may then transmit the update to the corresponding conversion engine for conversion.

Continuing with the first instance, sourcing engine 301 may receive a first update from the first data source (e.g., the first social media website) for the first user, a second update from the second data source (e.g., the second social media website) for the first user, a third update from the third data source (e.g., the third social media website) for the first user, and a fourth update from the fourth data source (e.g., the one or more internal databases) for the first user. Sourcing engine 301 may tag the first update with a first tag indicating the first data source, the second update with a second tag indicating the second data source, the third update with a third tag indicating the third data source, and the fourth update with a fourth tag indicating the third data source. At step 225, sourcing engine 301 may convert the updates such that the data in the updates is in the common format. Each of the updates may include data that is in a different format (as each of the updates is from a different data source). Accordingly, a different conversion engine may be used to convert each update. Accordingly, based on the first tag, sourcing engine 301 may transmit the first update to a first conversion engine 311 (discussed below in reference to FIG. 3). Sourcing engine 301 may include a flag in the transmittal indicating that the data in the transmittal is an update for the first user. Based on the second tag, sourcing engine 301 may transmit the second update to a second conversion engine 312 (discussed below in reference to FIG. 3). Sourcing engine 301 may include a flag in the transmittal indicating that the data in the transmittal is an update for the first user. Based on the third tag, sourcing engine 301 may transmit the third update to a third conversion engine 313 (discussed below in reference to FIG. 3). Sourcing engine 301 may include a flag in the transmittal indicating that the data in the transmittal is an update for the first user. Based on the fourth tag, sourcing engine 301 may transmit the fourth update to a fourth conversion engine 314 (discussed below in reference to FIG. 3). Sourcing engine 301 may include a flag in the transmittal indicating that the data in the transmittal is an update for the first user. The first conversion engine 311, second conversion engine 312, third conversion engine 313, and fourth conversion engine 314 may then convert the first update, second update, third update, and fourth update, respectively, into a common format. At step 227, the converted updates may be saved in common data module repository 320. Processing may then return to step 223, where sourcing engine 301 may receive additional updates from one or more data sources.

Figure 3:
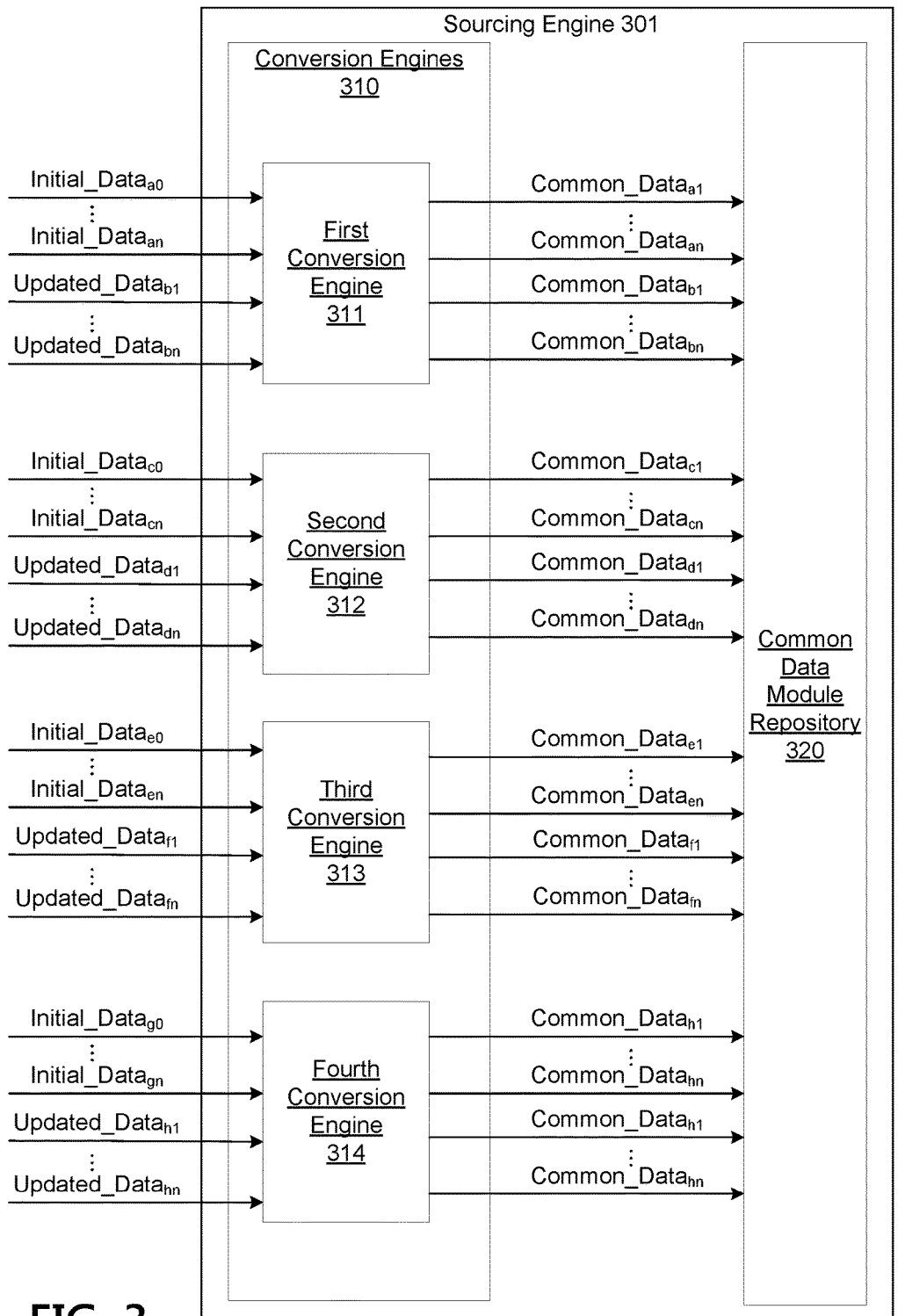
FIG. 3 depicts an illustrative sourcing engine that may be utilized to convert sourced user-related data to a common format in accordance with one or more aspects described herein.

FIG. 3 depicts an illustrative sourcing engine 301. Sourcing engine 301 may include one or processors or servers (not shown) that transmit requests for initial data and requests for updated data, and that receive the sets of initial data and the sets of updated data from one or more data sources. Sourcing engine 301 may further include one or more conversion engines. For example, as shown in FIG. 3, sourcing engine 301 may include first conversion engine 311, second conversion engine 312, third conversion engine 313, and fourth conversion engine 314. The depiction of four conversion engines is for illustrative purposes, and a greater number or fewer number of conversion engines may be used. For example, sourcing engine 301 may include one or more conversion engine for each data source from which sourcing engine 301 receives user data.

Each of first conversion engine 311, second conversion engine 312, third conversion engine 313, and fourth conversion engine 314 may receive one or more (shown as $Initial\_Data_{a0}$ . . . $Initial\_Data_{an}$, $Initial\_Data_{b0}$ . . . $Initial\_Data_{bn}$, $Initial\_Data_{c0}$ . . . $Initial\_Data_{cn}$, and $Initial\_Data_{a0}$ . . . $Initial\_Data_{an}$). Each set of initial data may be associated with a single user of the enterprise or may associated with a batch of users of the enterprise. Each set of initial data may include a tag identifying the single user or the batch of users with whom that set of initial data is associated. The format of the set of initial data received by each conversion engine may differ, as the data source for the sets of initial data may differ. For example, as discussed above in reference to FIG. 2, a first set of initial data received from a first data source may be sent to first conversion engine 311, a second set of initial data received from a second data source may be sent to second conversion engine 312, a third set of initial data received from a third data source may be sent to third conversion engine 313, and a fourth set of initial data received from a fourth data source may be sent to fourth conversion engine 314. First data source, second data source, third data source, and fourth data source may each be different data sources, and the data received from each of these data sources may be in a different data format. The conversion engines may convert the sets of initial data received from each of these data sources into a common, predetermined format.

Sourcing engine 301 may further include common data module repository 320. Common data module repository 320 may store a plurality of common data modules (not shown). A common data module may be stored for each user of the enterprise. Each common data module may include a plurality of common data fields. The common data fields may be predetermined data fields. For example, the common data fields may include name, age, gender, account number(s) (e.g., a list of account numbers associated with one or more financial accounts maintained by the enterprise for the user), services (e.g., a list of services provided by the enterprise for the user), marital status, family members (e.g., a list of family members of the user), employment status, current employer, education information (e.g., a list of colleges/universities that the user has graduated from, the date of graduation, and the like), residency location, contact information (phone number, email address, and the like), a set of user devices associated with the user and/or any other desired information. These common data fields may be populated with a value by one or more of first conversion engine 311, second conversion engine 312, third conversion engine 313, and fourth conversion engine 314 (discussed below). If multiple conversion engines have different values for a same common data field (for example, first conversion engine 311 has a first age for a first user and second conversion engine 312 has a second age for the first user), both values may be stored within the common data field. In addition to populating the common data fields with values, the conversion engines may populate the common data field with a timestamp indicating the time the value was received and a data source flag indicating the data source from which the value was received.

Accordingly, the common data module repository 320 may serve as a repository of all data for all users from all data sources. The data may be stored in a common format. The conversion engines may overwrite old data with new data as updates are received from data sources (discussed below). The conversion engines may further supplement old data with new data as updates are received from various data sources (discussed below).

First conversion engine 311 may convert one or more sets of initial data received from the first data source (shown as $Initial\_Data_{a0} \ldots Initial\_Data_{an}$) to produce one or more sets of data that are in compliance with a predetermined format (shown as $Common\_Data_{a0} \ldots Common\_Data_{an}$). As discussed above in reference to FIG. 2, each set of initial data sent to first conversion engine 311 may include information identifying the user or set of users associated with that set of initial data. First conversion engine 311 may extract the identifying information from the inputted set of initial data. If the inputted data is associated with a batch of users (e.g., the input includes multiple sets of initial data each associated with a different user), first conversion engine 311 may convert each set of initial data in parallel or sequentially.

First conversion engine 311 may convert a first set of initial data $Initial\_Data_{a0}$ associated with a first user by extracting one or more field names and corresponding field values from the first set of initial data. As discussed above in reference to FIG. 2, data from the first data source may be accessible via a first API that includes various nodes, edges, and fields. Sourcing engine 301 may sent an HTTP "Get" request to the first API that specifies the fields and/or edges that sourcing engine 301 requests to read. The first set of initial data received from the first data source may include one or more field names and a field value that is associated with each of the one or more field names. Conversion engine 311 may extract each of the one or more field names and the field values associated with each of the one or more field names from the first set of initial data $Initial\_Data_{a0}$. First conversion engine 311 may extract the data via cursor-based pagination or time-based pagination. First conversion engine 311 may then map the extracted field names and extracted field values to the common data fields to generate a set of common data $Common\_Data_{a0}$. First conversion engine 311 may then populate the common data fields in the common data module associated with the first user with the corresponding field values by transmitting the set of common data $Common\_Data_{a0}$ to common data module repository 320. First conversion engine 311 may repeat the conversion process for each set of initial data received from sourcing engine 301. That is, for an $n^{th}$ set of initial data $Initial\_Data_{an}$ received by first conversion engine 311 from sourcing engine 301 for an $n^{th}$ user, first conversion engine 311 may generate an $n^{th}$ set of common data $Common\_Data_{an}$ and populate the common data fields of the $n^{th}$ common data module maintained by the enterprise for the $n^{th}$ user within common data module repository 320.

As discussed above in reference to FIG. 2, first conversion engine 311 may additionally receive a set of updated data for a user. For example, first conversion engine 311 may receive a first set of updated data $Updated\_Data_{b1}$ for a first user, wherein the first set of updated data is associated with a first data source. The first set of updated data may include one or more field names, as well as a field value for each field name. First conversion engine 311 may extract each field name and corresponding field value from the first set of updated data. First conversion engine 311 may then map each field name to a corresponding common data field. First conversion engine 311 may then generate a first set of common data $Common\_Data_{b1}$ that includes the extracted field values that correspond to the common data fields. First conversion engine 311 may then transmit the first set of common data $Common\_Data_{b1}$ to common data module repository 320, and populate the first common module associated with first user with the corresponding extracted field values.

First conversion engine 311 may populate the first common module differently based on the current contents of the first common module. For example, the first set of updated data $Updated\_Data_{b1}$ for the first user received by first conversion engine 311 from sourcing engine 301 (and the first data source) may include a field name and field value indicating that the current age of the first user is 30. First conversion engine 311 may analyze the corresponding common data field and value in the first common data module. If the corresponding common data field is non-populated (e.g., does not contain a value), first conversion engine 311 may populate the value of the corresponding common data field with the value in the set of common data $Common\_Data_{b1}$. First conversion engine 311 may further include a timestamp and a flag indicating that the value is associated with the first data source. If the corresponding common data field is populated with a current value, first conversion engine 311 may determine the data source associated with the current value. If the data source associated with the current value is the first data source, first conversion engine 311 may overwrite the current value of the corresponding common data field with the field value in the common data set $Common\_Data_{b1}$ (e.g., 30). First conversion engine 311 may further include a timestamp and a flag indicating that the value is associated with the first data source. If the data source associated with the current value is not the first data source, first conversion engine 311 may not modify the current value and further populate the corresponding common data field with the field value in the common data set $Common\_Data_{b1}$ (e.g., 30). First conversion engine 311 may further include a timestamp and a flag indicating that the value is associated with the first data source. If the first set of updated data included multiple field names and field values, first conversion engine 311 may update the first common module as described above for each field name and field value. First conversion engine 311 may repeat the updating process for each set of updated data received from sourcing engine 301. That is, for an $n^{th}$ set of updated data $Updated\_Data_{bn}$ received by first conversion engine 311 from sourcing engine 301 for an $n^{th}$ user, first conversion engine 311 may generate an $n^{th}$ set of common data $Common\_Data_{bn}$ and populate the common data fields of the $n^{th}$ common data module maintained by the enterprise for the $n^{th}$ user within common data module repository 320.

Second conversion engine 312, third conversion engine 313, and fourth conversion engine 314 may similarly receive and convert sets of initial data. The extraction and mapping utilized by each conversion engine may differ as a result of the different formats of the received sets of initial data and updated data. Second conversion engine 312 may receive one or more sets of initial data $Initial\_Data_{c1} \ldots Initial\_Data_{cn}$. Second conversion engine 312 may extract field names and field values within each of these sets of initial to produce one or more sets of common data $Common\_Data_{c1} \ldots Common\_Data_{cn}$. Second conversion engine 312 may then populate the common data modules associated with the users for which the sets of initial data are received (and stored in common data module repository 320) with the values in the sets of common data $Common\_Data_{c1} \ldots Common\_Data_{cn}$ using the population method for sets of initial data described above in reference to first conversion engine 311. Second conversion engine 312 may include a time stamp for each populated value and an indication that the populated value is associated with the second data source. Second conversion engine 312 may further receive one or more sets of updated data Updated_Data$_{d1}$ . . . Updated_Data$_{dn}$. Second conversion engine 312 may extract field names and field values within each of these sets of updated data to produce one or more sets of common data Common_Data$_{d1}$ . . . Common_Data$_{dn}$. Second conversion engine 312 may then populate the common data modules associated with the users for which the sets of updated data are received (and stored in common data module repository 320) with the values in the sets of common data Common_Data$_{d1}$ . . . Common_Data$_{dn}$ using the population method for sets of updated data described above in reference to first conversion engine 311. Second conversion engine 312 may include a time stamp for each populated value and an indication that the populated value is associated with the second data source.

Third conversion engine 313 may receive one or more sets of initial data Initial_Data$_{e1}$ . . . Initial_Data$_{en}$. Third conversion engine 313 may extract field names and field values within each of these data sets to produce one or more sets of common data Common_Data$_{e1}$ . . . Common_Data$_{en}$. Third conversion engine 313 may then populate the common data modules associated with the users for which the sets of initial data are received (and stored in common data module repository 320) with the values in the sets of common data Common_Data$_{e1}$ . . . Common_Data$_{en}$ using the population method for sets of initial data described above in reference to first conversion engine 311. Third conversion engine 313 may include a time stamp for each populated value and an indication that the populated value is associated with the third data source. Third conversion engine 313 may further receive one or more sets of updated data Updated_Data$_{f1}$ . . . Updated_Data$_{fn}$. Third conversion engine 313 may extract field names and field values within each of these sets of updated data to produce one or more sets of common data Common_Data$_{f1}$ . . . Common_Data$_{fn}$. Third conversion engine 313 may then populate the common data modules associated with the users for which the sets of updated data are received (and stored in common data module repository 320) with the values in the sets of common data Common_Data$_{f1}$ . . . Common_Data$_{fn}$ using the population method for sets of updated data described above in reference to first conversion engine 311. Third conversion engine 313 may include a time stamp for each populated value and an indication that the populated value is associated with the third data source.

Fourth conversion engine 314 may receive one or more sets of initial data Initial_Data$_{g1}$ . . . Initial_Data$_{gn}$. Fourth conversion engine 314 may extract field names and field values within each of these data sets to produce one or more sets of common data Common_Data$_{g1}$ . . . Common_Data$_{gn}$. Fourth conversion engine 314 may then populate the common data modules associated with the users for which the sets of initial data are received (and stored in common data module repository 320) with the values in the sets of common data Common_Data$_{g1}$ . . . Common_Data$_{gn}$ using the population method for sets of initial data described above in reference to first conversion engine 311. Fourth conversion engine 314 may include a time stamp for each populated value and an indication that the populated value is associated with the fourth data source. Fourth conversion engine 314 may further receive one or more sets of updated data Updated_Data$_{h1}$ . . . Updated_Data$_{hn}$. Fourth conversion engine 314 may extract field names and field values within each of these sets of updated data to produce one or more sets of common data Common_Data$_{h1}$ . . . Common_Data$_{hn}$. Fourth conversion engine 314 may then populate the common data modules associated with the users for which the sets of updated data are received (and stored in common data module repository 320) with the values in the sets of common data Common_Data$_{h1}$ . . . Common_Data$_{hn}$ using the population method for sets of updated data described above in reference to first conversion engine 311. Fourth conversion engine 314 may include a time stamp for each populated value and an indication that the populated value is associated with the fourth data source.

Figure 4:
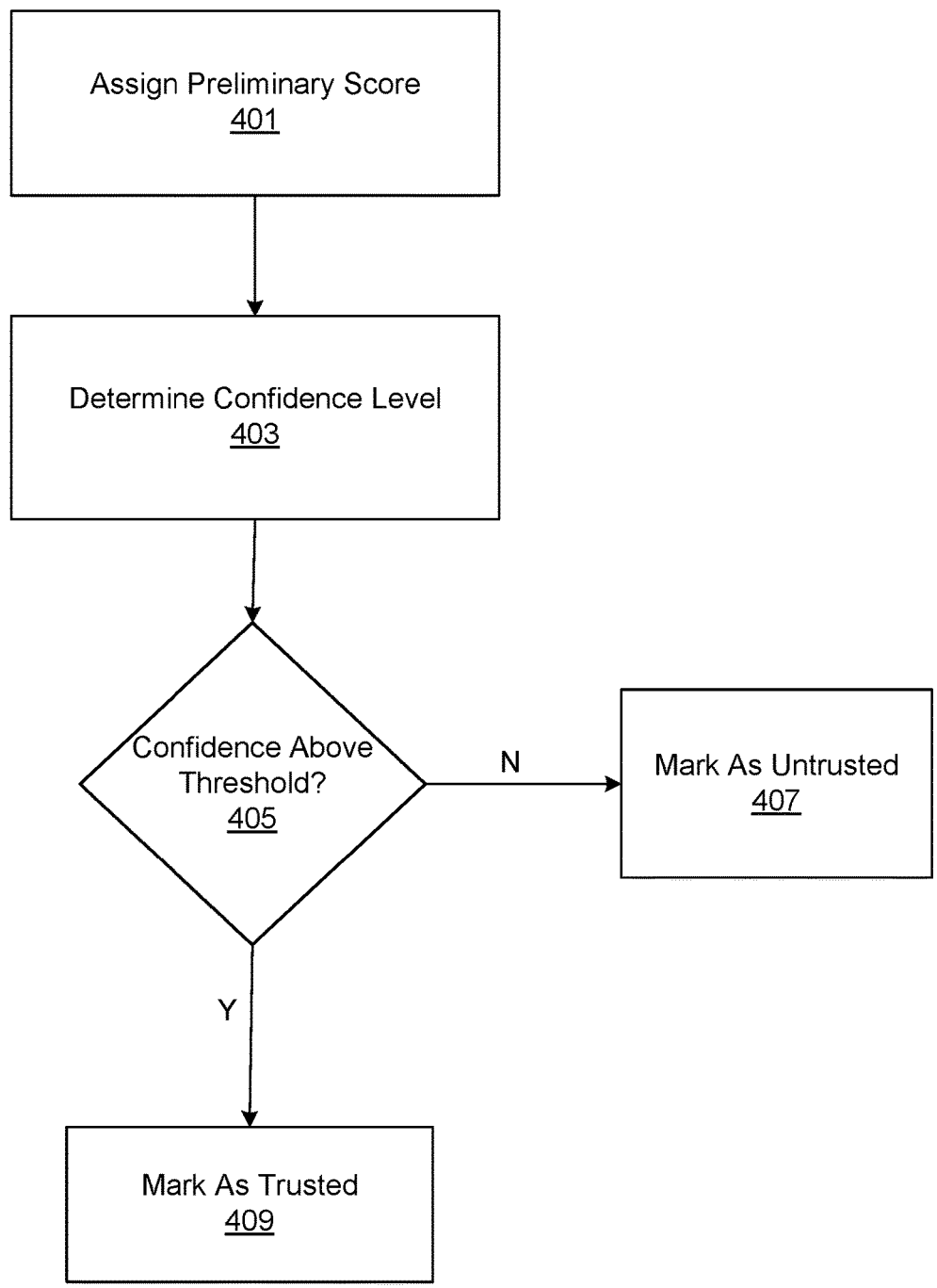
FIG. 4 depicts an illustrative method for analyzing one or more common data fields in accordance with one or more aspects described herein.

FIG. 4 depicts an illustrative method for analyzing one or more common data fields. The method may be executed by rules engine 126 of automated service initiation engine 124. Rules engine 126 may analyze one or more common data fields from one or more common modules in common data module repository 320 utilizing the illustrated method. At step 401, rules engine 126 may assign a preliminary score to a first common data field. The first common data field may be stored in a first common data module in common data module repository 320. The first common data module may be associated with a first user.

Rules engine 126 may assign a preliminary score to the first common data field based on a first set of rules stored in rules engine 126. The first set of rules may include one or more probabilistic models that may be dynamically modified within rules engine 126. The first set of rules may include relationships between common data fields and the data source(s) that provided the value(s) of the common data fields. That is, as discussed above in reference to FIG. 3, a common data field may include multiple values, wherein each value may be received from a different data source (such as the first data source, second data source, third data source, and fourth data source discussed above in reference to FIG. 2). The first set of rules may indicate the preliminary scores to be assigned to these values based on the data sources that provided these values.

For example, each common data module stored in common data module repository 320 may include at least a first common data field and a second common data field. In this example, the first common data field may be the marital status of the first user, and the second common data field may represent the employment status of the second user. The first common data field of the first common data module may store a first value that was received by sourcing engine 301 from the first data source. The first common data field of the first common data module may further store a second value that was received by sourcing engine 301 from the third data source. The second common data field of the first common data module may store a third value that was received by sourcing engine 301 from the first data source. The second common data field of the first common data module may further store a fourth value that was received by sourcing engine 301 from the third data source. The first set of rules may indicate that a value for the first common data field that is associated with the first data source is to be assigned a first score and that a value for the first common data field that is associated with the third data source is to be assigned a second score. The second score may be lower than the first score. That is, the enterprise may have determined that values for the first common data field are more reliable when sourced from the first data source than when sourced from the third data source, and the first set of rules may indicate this. The first set of rules may further indicate that a value for the second common data field that is associated with the first data source is to be assigned a third score and that a value for the second common data field that is associated with the third data source is to be assigned a fourth score. The fourth score may be higher than the third score. That is, the enterprise may have further determined that values for the second common data field are more reliable when sourced from the third data source than when sourced from the first data source, and the first set of rules may indicate this.

At step 403, rules engine 126 may determine a confidence level for the first common data field based on a second set of rules stored in rules engine 126. Rules engine 126 may determine the confidence level by applying the second set of rules to the preliminary score calculated in step 401. The second set of rules may include one or more probabilistic models. For example, a first rule in the second set of rules may indicate that if the timestamp associated with a first value of the first common data field indicates that the first value was sourced prior to a predetermined date or prior to a predetermined amount of time, the preliminary score is to be decreased. The first rule in the second set of rules may further indicate that if the timestamp associated with the first value was not sourced prior to a predetermined date or prior to a predetermined amount of time, the preliminary score is to be increased. A second rule in the second set of rules may analyze the number of values that are currently populated for the common data field. That is, as noted above, a common data field may include multiple values, wherein each value may be received from a different data source. The second rule may adjust the preliminary score based on the number of values that are currently stored in the common data field. The second rule may include multiple thresholds levels. In one instance, the second rule may specify that if the common data field only includes a single value, the preliminary score is to be increased by a first amount. The second rule may further specify that if the number of values stored for a common data field is between a first threshold and a second threshold, the preliminary score is to be decreased by a second amount. If the number of values stored for a common data field is between a third threshold and fourth threshold, the second rule may indicate that the preliminary score is to be decreased by a third amount, and so forth.

For example, each common data module stored in common data module repository 320 may include at least a first common data field and a second common data field. The first common data field of the first common data module may store a first value that was received by sourcing engine 301 from the first data source. The first common data field may further store a second value that was received by sourcing engine 301 from the second data source. The second common data field may store only a third value that was received by sourcing engine 301 from the first data source. In this example, rules engine 126 may increase the preliminary score calculated for the first common data field at step 401, as the first common data field only stores a single value. Rules engine 126 may further decrease the preliminary score calculated for the second common data field at step 401, as the second common data field stores multiple values.

The first rule of the second set of rules and the second rule of the second set of rules are for illustrative purposes, and a greater number of rules or fewer number of rules may be included in the second set of rules. Rules engine 126 may adjust the preliminary score calculated in step 401 using a plurality of rules from the second set of rules. For example, rules engine 126 may increase the preliminary score calculated in step 401 after applying a first rule, and may then decrease the adjusted preliminary score after applying a second rule. Once rules engine 126 has applied all applicable rules from the second set of rules, the final calculated score may represent the confidence level of the first common data field.

At step 405, rules engine 126 may determine if the confidence level calculated in step 403 is above a threshold. The threshold used in step 405 may be predetermined and may be dynamically modified within rules engine 126. If, at step 405, rules engine 126 determines that the confidence level is not above the threshold, rules engine 126 may, at step 407, set a flag within the first common data module indicating that the first common data field is not a trusted data field. If, at step 405, rules engine 126 determines that the confidence level is above the threshold, rules engine 126 may, at step 409, set a flag within the first common data module indicating that the first common data field is a trusted data field. Trusted data fields may then be utilized by one or more components within user interaction optimization system 110 to drive further user-based decision making.

Figure 5:
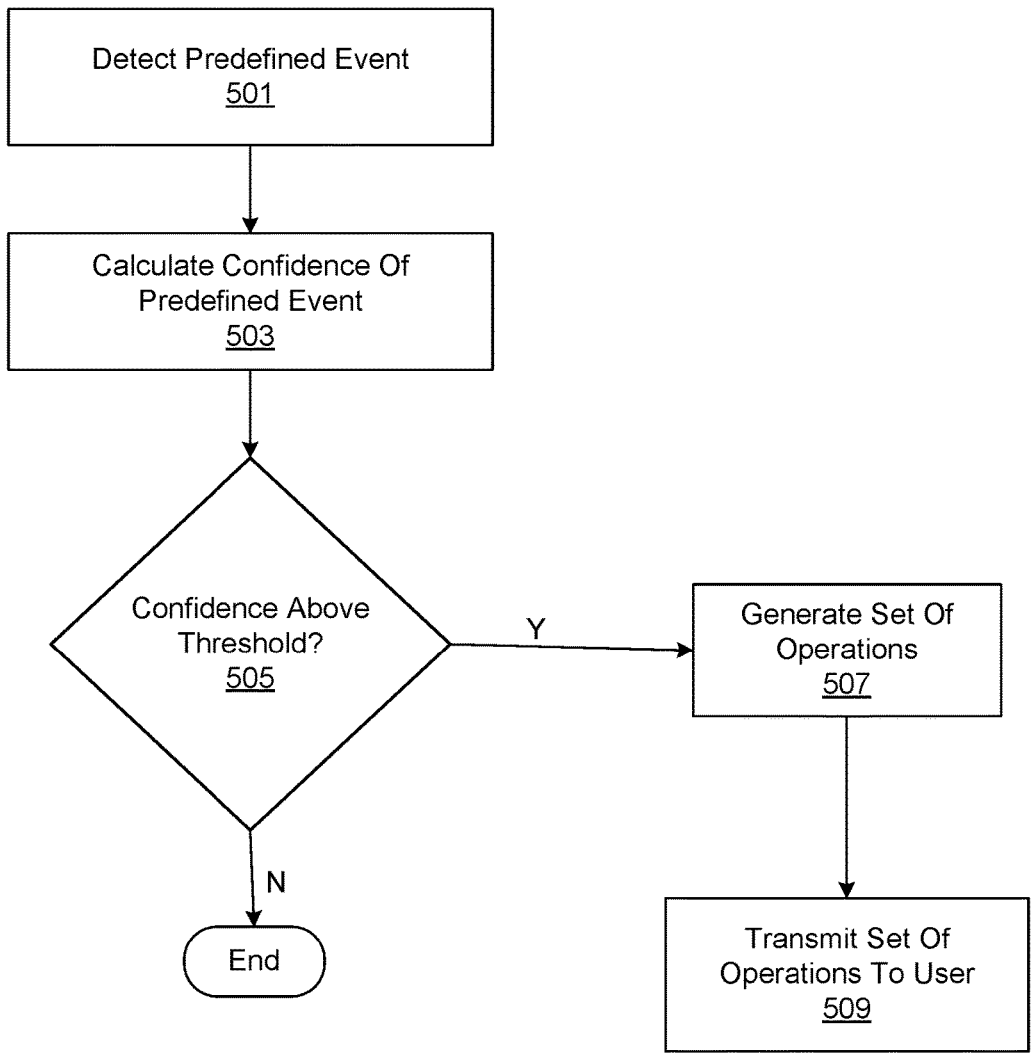
FIG. 5 depicts an illustrative method for detecting a predefined event utilizing one or more common data fields in accordance with one or more aspects described herein.

FIG. 5 depicts an illustrative method for detecting a predefined event utilizing one or more common data fields. The illustrative method may be executed by services triggering engine 128 of automated service initiation engine 124. Services triggering engine 128 may monitor the flags set by rules engine 126 within the common data modules stored in common data module repository 320 in order to detect predefined events. That is, services triggering engine 128 may monitor common data fields that have been marked as "trusted" by rules engine 126 to determine if the values of one or more trusted common data fields is indicative of a predefined event. A predefined event may be defined as any change in value of a common data field and/or a change in value of a common data field to a predefined value. Alternatively, or additionally, a predefined event may be defined as any changes in values of a combination of common data fields and/or changes in values of a combination of common data fields to predefined values. At step 501, services triggering engine 128 may detect a predefined event that is based on a change in value of one or more common data fields. The one or more common data fields may be stored in a first common data module in common data module repository 320. The first common data module may be associated with a first user.

In a first example, sourcing engine 301 may receive first updated data for a first user from a first data source. Sourcing engine 301 may send the updated data to the first conversion engine 311. Conversion engine 311 may extract the field name and field value from the first updated data and map the extracted field name to a first common data field. First conversion engine 311 may further generate a first set of common data and transmit the first common set of data to common data module repository 320 in order to populate the first common data field with the extracted field value. Rules engine 126 may then analyze the first common data field and determine that the first common data field is a trusted data field. Services triggering engine 128 may then analyze the first common data field to determine whether the updated value stored in the first common data field represents a predefined event.

In a second example, sourcing engine 301 may receive first updated data for a first user from a first data source. Sourcing engine 301 may further receive second updated data for the first user from a second data source. Sourcing engine 301 may send the first updated data to the first conversion engine 311. Sourcing engine 301 may further send the second updated data to the second conversion engine 312. First conversion engine 311 may extract the field name and field value from the first updated data and map the extracted field name to a first common data field. First conversion engine 311 may further generate a first set of common data and transmit the first set of common data to common data module repository 320 in order to populate the first common data field with the extracted field value. Second conversion engine 312 may extract the field name and field value from the second updated data and map the extracted field name to a second common data field. Second conversion engine 312 may further generate a second set of common data and transmit the second set of common data to common data module repository 320 in order to populate the second common data field with the extracted field value. Rules engine 126 may analyze the first common data field and determine that the first common data field is a trusted data field. Rules engine 126 may further analyze the second common data field and determine that the second common data field is a trusted data field. Services triggering engine 128 may then analyze the first common data field and the second common data field to determine whether the updated value stored in the first common data field and the second common data field represents a predefined event. For example, the rules of rules engine 126 may provide that an upcoming marriage is likely where the collected data includes: (1) information retrieved from an internal bank server relating to a large transaction at a jewelry store; and/or (2) a relationship status of "In a Relationship" retrieved from one or more social media data sources. In another example, the rules may provide that recent home purchase is likely where the collected data includes: (1) information retrieved from an internal bank server relating to an approved mortgage loan application; and/or (2) an event retrieved from the first data source, where the event body includes the words "house warming."

At step 503, services triggering engine 128 may analyze the detected predefined event to calculate a confidence level of the predefined event. Services triggering engine 128 may analyze the detected predefined event using one or more rules. The one or more rules may be probabilistic models. The one or more rules may be dynamically modified within services triggering engine 128. As noted above, a predefined event may be defined as any change in value(s) of one or more common data fields, and/or the setting of one or more values of one or more common data fields to one or more predefined values. Therefore, different rules may be used to analyze the detected predefined event based on the subject common data field(s). For example, a first predefined event may be defined as any change made to a first common data field. Accordingly, services triggering engine 128 may use a first rule (or first set of rules) to determine a confidence level of a detected first predefined event. A second predefined event may be defined as determining that the value of the first common data field is set to a predefined value. Services triggering engine 128 may use a second rule (or second set of rules) to determine the confidence level of a detected second predefined event. A third predefined event may be defined as any change in value made to both a first common data field and a second common data field. Services triggering engine 128 may use a third rule (or third set of rules) may be used to determine the confidence level of a detected third predefined event. A fourth predefined event may be defined as determining that a first value of a first common data field is set to a first predefined value and that a second value of a second common data field is set to a second predefined value. Services triggering engine 128 may use a fourth rule (or fourth set of rules) to determine the confidence level of a detected fourth predefined event.

At step 505, services triggering engine 128 may determine if the confidence level of the detected predefined event is above a threshold. The threshold may be predetermined and may be dynamically modified within services triggering engine 128. If, at step 505, services triggering engine 128 determines that the confidence level of the detected predefined event is not above the threshold, processing may end. If, at step 505, services triggering engine 128 determines that the confidence level of the detected predefined event is above the threshold, services triggering engine 128 may, at step 507, generate a set of operations.

The set of operations generated by services triggering engine 128 may depend on the specific predefined event that is detected by services triggering engine 128 at step 501. Services triggering engine 128 may maintain a master list of operations and a master list of predefined events. Each operation in the master list of operations may be associated with one or more predefined events from the master list of predefined events. In turn, each predefined event in the master list of predefined events may be associated with one or more operations from the master list of operations. The associations between the operations and the predefined events may be predetermined and may be dynamically modified within services triggering engine 128. Each operation in the master list of operations may further be associated with a preferred timeframe during which that operation should be completed.

Services triggering engine 128 may determine, from the master list of predefined events, a set of operations associated with the predefined event detected at step 501. Each operation in the set of operations may be an operation that is to be completed by the first user. For example, the predefined event detected at step 501 may be a change in employment information for the first user (e.g., the first user has an updated employer). In this example, a potential operation may be the completion of a new direct deposit form. Another potential operation may require the first user to sign onto an online portal provided by the enterprise and update the first user's employment information within the online portal. In another example, the predefined event detected at step 501 may be a change in the first user's marital status (e.g., the first user may have recently divorced). A potential operation may require the first user to login to the online portal provided by the enterprise and update the first user's marital information. Additionally, or alternatively, a potential operation may require the first user to provide updated account information to the enterprise (e.g., modify a financial account maintained by the enterprise for the first user from a joint account to a single-holder account). Services triggering engine 128 may compile the set of operations into a master checklist. The master checklist may include each operation and the preferred timeframe for completion of each operation. The master checklist may further include additional information that may be needed to complete operations in the master checklist. For example, if a first operation requires the first user to login to an online portal maintained by the enterprise, the master checklist may include an embedded Internet link to the online portal. If the first user clicks on the Internet link via a computing device, the first user may be taken to the online portal on the computing device.

At step 509, the set of operations may be sent to the first user in the form of the master checklist. Services triggering engine 128 may determine contact information for the first user by accessing the information from the first common data module in the common data module repository 320. For example, services triggering engine 128 may determine the home address of the first user, a mobile device associated with the first user, and an email address associated with the first user. Services triggering engine 128 may then send the master checklist via one or more of these channels. If the contact information for the first user includes multiple mobile devices and/or email addresses, the master checklist may be sent to each mobile device and/or email address. For example, services triggering engine 128 may send a link to the master checklist to the mobile device associated with the first user via a text message. If the first user selects the link in the text message, the first user may be directed, via the mobile device, to on an Internet website displaying the master checklist. The user may then view the master checklist on the mobile device and select any embedded links within the displayed master checklist. Alternatively, or additionally, services triggering engine 128 may send an email to an email address associated with the first user. The first user may view the email on a first computing device. The email may include the master checklist within the body of the email. The first user may select any embedded links directly within the email, and be directed to the online portal maintained by the enterprise. Alternatively, the email may include an Internet link to the master checklist. The first user may select the Internet link and be directed to an Internet website (or online portal) displaying the master checklist. The first user may then select embedded Internet links within the displayed master checklist. The first user may complete the operations of the master checklist via the computing device the first user utilizes to access the master checklist or via a one or more additional computing devices. Once the first user completes an operation listed in the master checklist via a computing device, a notification may be transmitted from the computing device to the services triggering engine 128 via one or more organization computing devices and/or networks. Services triggering engine 128 may then generate an updated master checklist. The updated master checklist may only include the operations that still need to be completed by the first user, or may mark completed operations as "complete." Services triggering engine 128 may then transmit the updated master checklist to the first user via one or more email address associated with the first user or via one or more mobile devices associated with the first user.

Figure 6:
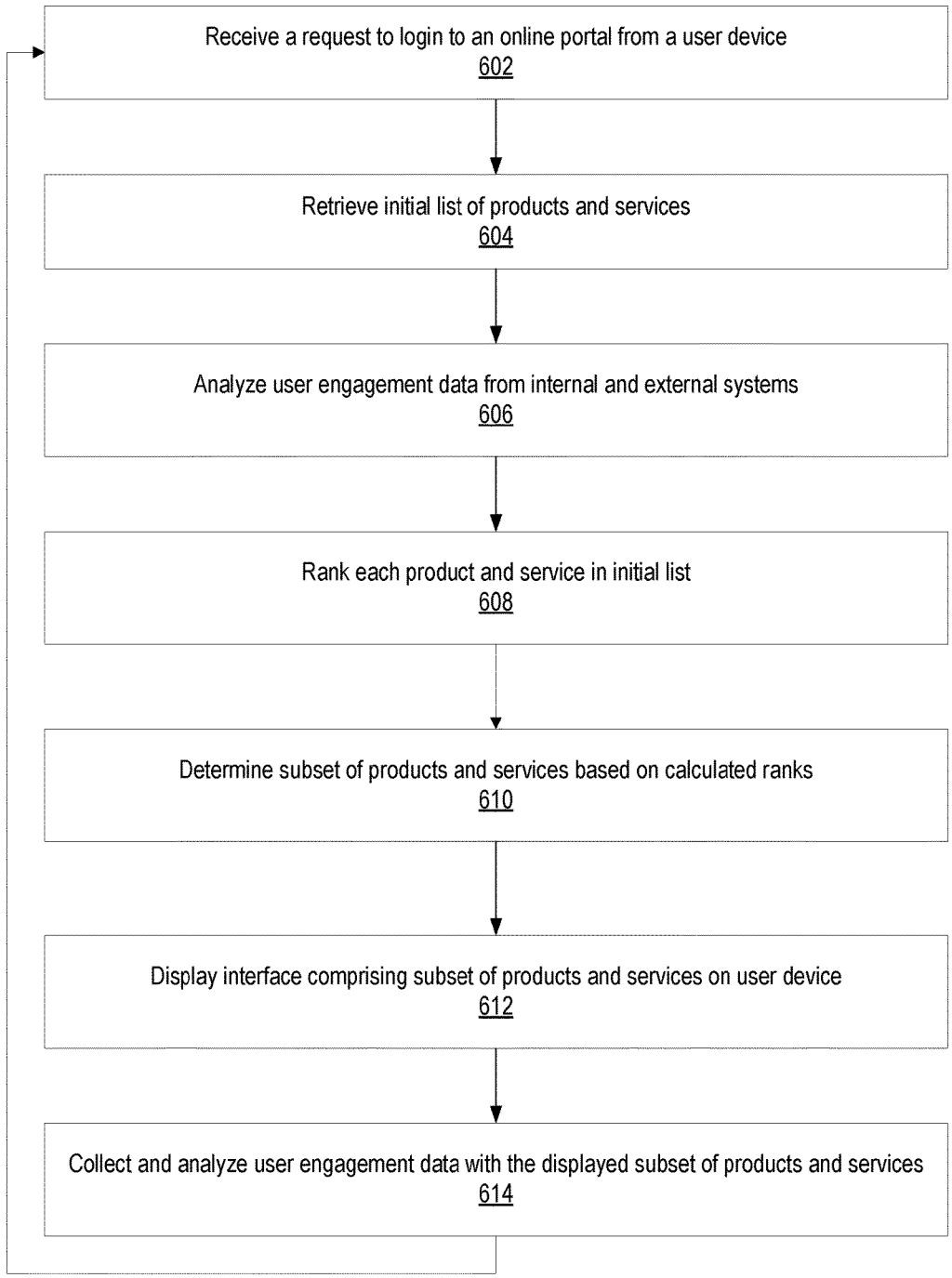
FIG. 6 depicts an illustrative method for displaying an optimized subset of products and services in accordance with one or more aspects described herein.

FIG. 6 depicts an illustrative method for displaying an optimized subset of products and services. The depicted illustrative method may be executed by automated interface optimization engine 130. Automated interface optimization engine 130 may execute the illustrated steps in response to a first user requesting access to an online portal provided by the enterprise. Generally, the online portal may provide the first user access to all accounts maintained by the enterprise for the first user. The online portal may further provide the first user information on additional products and services provided by the enterprise. The first user may access the online portal via a first computing device. The products and services that are displayed to the user when the user first accesses the online portal may be limited by the size of the display screen of the first computing device. Accordingly, it may be advantageous to prioritize the displayed products or services based on the products or services that the first user is likely to find interesting or helpful.

In step 602, the automated interface optimization engine 130 may receive a request to login to an online portal from a user device 162. The request may include an authenticating username and password. In step 604, the automated interface optimization engine 130 may retrieve an initial list of products and services. The initial list of products and services may be stored within products and services index 134. The initial list of products and services may include each product and service that is offered by enterprise and for which information may be displayed on the online portal.

For example, the products and services may include retirement accounts, brokerage accounts, financial advisory services, and the like. In step 606, the automated interface optimization engine 130 may analyze user engagement data from one or more internal sources (e.g., organization servers 164, and the like), one or more external sources 150 (e.g., search systems, social media channels, and the like), and/or one or more user devices 162. The user engagement data may be aggregated by multi-platform API 132 and stored in interface optimization database 131.

Figure 7:
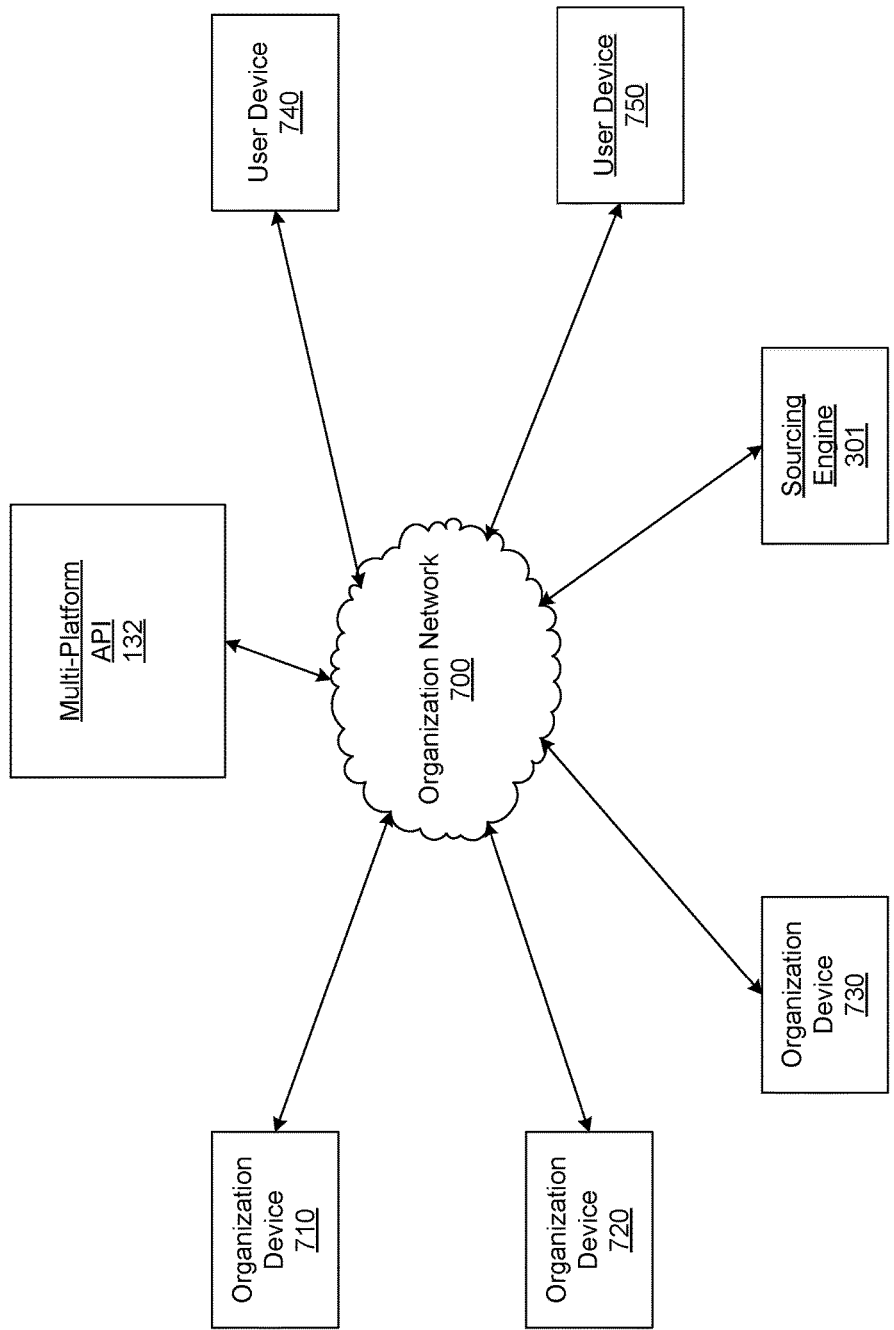
FIG. 7 depicts an illustrative block diagram of networked computing devices that may bi-directionally communicate with a multi-platform API in accordance with one or more example embodiments.

A block diagram illustrating multi-platform API 132 and the one or more computing devices that may be bi-directionally connected to multi-platform API 132 is illustrated in FIG. 7. Multi-platform API 132 may be connected to one or more organization devices 710, 720, and 730, sourcing engine 301, and user devices 740 and 750. Multi-platform API 132 may be connected to each of these computing devices and/or platforms via organization network and one or more additional networks, such as the Internet (not shown). Organization devices 710, 720, and 730 and user devices 740 and 750 may be any type of computing device capable of displaying a user interface, receiving input via the user interface, and communicating the received input to one or more other computing devices. For example, organization devices 710, 720, and 730 may include a server computer, a desktop computer, laptop computer, tablet computer, smart phone, automated teller machine (ATM), or the like. User devices 740 and 750 may include a server computer, a desktop computer, laptop computer, tablet computer, smart phone, or the like.

Multi-platform API 132 may receive user engagement data for a user from any of the computing devices shown in FIG. 7. Each of the computing devices may track user engagement data for a plurality of different users. Each of the computing devices may tag the user engagement data with information identifying a user associated with the user engagement data prior to transmitting the user engagement data to multi-platform API 132. User engagement data may be any data associated with a user's interaction with the enterprise. The user may interact with the enterprise via one or more banking centers and/or other physical retail locations operated by the enterprise, a telephone banking channel (which may, e.g., be associated with one or more telephone lines serviced by one or more user service representatives and/or call centers of the enterprise), an online banking channel (which may, e.g., be associated with one or more online portals and/or mobile banking applications provided by the enterprise), an automated teller device channel (which may, e.g., be associated with one or more automated teller machines (ATMs), automated teller assistants (ATAs), and/or other automated teller devices operated by the enterprise), and/or one or more other channels. Each of these channels may be associated with an organization device, such as organization devices 710, 720, and 730. Organization devices 710, 720, and 730 may be configured to log any data associated with the user that is entered into to the organization devices. Organization devices 710, 720, and 730 may further be configured to transmit the logged information to multi-platform API 132. Engagement data received from sourcing engine 301 may include any of the sets of common data discussed above in reference to FIG. 3. Alternatively, engagement data received from sourcing engine 301 may include any common data field that has been marked as trusted by sourcing engine 301 (discussed above in reference to FIG. 4).

In a first example, user device 740 may be a mobile device. A first user may access one or more online portals and/or mobile banking applications provided by the enterprise via the mobile device. The one or more online portals and/or mobile banking applications provided by the enterprise may each present a user interface on user device 740. User device 740 may include one or more client-side tracking mechanisms. The engagement data of the first user on user device 740 may be tracked using, for example, cookies and/or web beacons. The cookies may be transient cookies (e.g., a cookie that is limited to the user's current online banking session, and will be erased once the session is closed or completed) or permanent cookies (e.g., a cookie that is stored on the user device 740 until its expiration date or until it is deleted). A web beacon may be an object (e.g., a transparent 1-pixel×1-pixel image, an iframe, and the like) embedded in the client-side instructions (e.g., HTML, and the like) rendered on the user interface presented on the user device 740. These example client-side tracking mechanisms may provide information including, but not limited to, the time of access by the user device 740, the IP address of the user device 740, and configuration information related to the user device 740, and user engagement data on the user device 740 in accordance with method of sourcing data described above with reference to the fourth data source. That is, a first user interface presented to the first user on user device 740 may include a first link to information on a first service provided by the enterprise and a second link to information on a first service provided by the enterprise. The first user may select the first link during a session on an online portal and/or mobile banking application. The first user may not select the second link during the same session. The client-side tracking mechanisms may log the first user's selection of the first link, the first user's non-selection of the second link, the amount of time the first user spends analyzing information about the first service, and the like. User device 740 may tag the logged engagement with information identifying the first user. The tagged engagement data may then be transmitted to multi-platform API 132 via one or more networks. Continuing with the first example, user device 750 may be a computing device such as a laptop. The first user may access the one or more online portals and/or mobile banking applications provided by the enterprise via user device 750. User device 750 may track engagement for the first user utilizing the same mechanisms discussed above in reference to user device 740. User device 750 may tag the tracked user engagement with information identifying the first user and may transmit the tagged engagement data to multi-platform API 132. Multi-platform API 132 may store the user engagement data within interface optimization database 131.

In addition to tracking user engagement data from user devices 740 and 750 via client-side tracking mechanisms, user engagement data on these devices may be tracked using server-side tracking mechanisms. On the server-side, the multi-platform API 132 may receive user engagement data using, for example, application logs stored on an organization server 164. For instance, the multi-platform API 132 may scrap the application log files determine the IP address of the accessing device, the hostname, the language, the date and time the page was loaded on the client-side, the page(s) loaded on the client-side, the referring page(s), the services or product information pages viewed, and the like. Multi-platform API 132 may tag this engagement data with information identifying the user and store the tagged user engagement data within interface optimization database 131.

Continuing with the first example, organization device 710 may be a first computing device used by an individual associated with the enterprise. For example, organization device 710 may be a first computing device used by a financial advisor who provided financial advisory services to a first user. The financial advisor may access, via an online portal, information associated with one or more accounts maintained for the first user. The financial advisor may indicate, within the online portal, when a session with the first user begins and ends. Organization device 710 may include one or more client-side tracking mechanisms similar to those discussed above in reference to user device 740. These client-side tracking mechanisms may track the financial advisor's interaction with the online portal during the session with the first user. For example, the client-side tracking mechanisms may track how long the financial advisor spends accessing information regarding different accounts associated with the first user, whether the financial advisor accesses (and for how long) information related to products and services that are available to the first user but not currently utilized by the first user, whether the financial advisor accesses (and for how long) information related to products and services that are utilized by the first user, and the like. Organization device 710 may tag the tracked user engagement data with information identifying the first user. The tagged user engagement data may be transmitted from the organization device 710 to multi-platform API 132 via one or more networks, such as organization network 700. Multi-platform API 132 may store the user engagement data within interface optimization database 131.

Continuing with the first example, organization device 720 may be a second computing device used by an individual associated with the enterprise. For example, organization device 710 may be a second computing device utilized by one or more user service representatives and/or call centers of the enterprise. The first user may contact the call center and may be directed to a first user service representative. The first user may provide the first user service representative with identifying information, such as the name of the first user and account information of the first user. This information may be entered into organization device 720 by the first user service representative via an online portal presented on the organization device 720. The first user service representative may indicate, in the online portal, when a session with the first user begins and ends. Organization device 720 may include one or more client-side tracking mechanisms similar to those discussed above in reference to user device 740. These client-side tracking mechanisms may track the first user service representative's interaction with the online portal during the session with the first user. For example, the client-side tracking mechanisms may track how long the first user service representative spends accessing information regarding different accounts associated with the first user, whether the financial advisor accesses (and for how long) information related to products and services that are available to the first user but not currently utilized by the first user, whether the financial advisor accesses (and for how long) information related to products and services that are utilized by the first user, and the like. Organization device 720 may tag the tracked user engagement data with information identifying the first user. The tagged user engagement data may be transmitted from the organization device 720 to multi-platform API 132 via one or more networks, such as organization network 700. Multi-platform API 132 may store the user engagement data within interface optimization database 131.

Continuing with the first example, organization device 730 may be a computing device provided by the enterprise and used by users of the enterprise. For example, organization device 730 may be an ATM. Organization device 730

(e.g., an ATM) may be in signal communication with an organization server 164 (via the organization network 700 and one or more additional networks (not shown)). Therefore, the multi-platform API 132 may collect user engagement data at the ATM (e.g., at the client-side), at the organization server 164 (e.g., at the server-side), or a combination of both. On the client-side, the user engagement data may be tracked using cookies and/or web beacons, as described above in reference to user device 740. Additionally or alternatively, various sensors may be installed at, attached to, or in signal communication with the ATM to track client-side user engagement. The sensors may be capable of detecting and recording various conditions at the ATM relating to the user's interaction with the ATM. For instance, the sensors may include a motion sensor (e.g., to monitor movement of the user at the ATM, such eye tracking), a presence sensor (e.g., to monitor presence of the user at the ATM), a pressure sensor (e.g., to monitor the use of the ATM's input devices, such as the keypad), and so forth. As such, the sensors may be capable of collecting data indicating engagement by the user, such as the data accessed by the user via the ATM. For example, a main menu in a user interface displayed on the ATM may include a first link to a first account maintained for the first user by the enterprise, a second link to a second account maintained for the first user by the enterprise, a third link to a first product offered by the enterprise, and a fourth link to a second product offered by the product. The first user may first select, during a session at the ATM, the first link. In response to the selection of the first link, the user interface may present a first page to the first user. The client-side tracking mechanisms on the ATM may track the selection of the first link, as well as the amount of time the first user spends on the first page, and any further selections made by the first user on the first page. The first user may then return to the main menu and then select the third link. The user interface may present a second page in response to the first user's selection of the third link. The client-side tracking mechanisms on the ATM may track the first user's selection of the third link, the amount of time the first user spends on the second page, and any further selections made by the first user on the second page. The first user may then end the session at the ATM. The client-side tracking mechanisms may track the user's non-selection of the second link associated with the second account and non-selection of the fourth link associated with the second product. Organization device 730 may tag all tracked user engagement data with information identifying the first user. Organization device 730 may then transmit the tagged user engagement data to multi-platform API 132 via organization network 700 and one or more additional networks (not shown). Multi-platform API 132 may receive the tracked user engagement data from organization device 730 and store the data in interface optimization database 131.

Returning to FIG. 6, the automated interface optimization engine 130 may analyze the user engagement data collected from the one or more organization devices 710, 720, and 730, sourcing engine 301, and user devices 740 and 750 for a particular user. That is, automated interface optimization engine 130 may identify the user associated with the user device from which the request was received in step 602. Automated interface optimization engine 130 may identify the user based on information within the request itself (e.g., based on the login username and password). Automated interface optimization engine 130 may then extract user engagement data that is tagged with information identifying the user from interface optimization database 131.

In some examples, the automated interface optimization engine 130 may analyze the user engagement data according to the rules mapping data sources to certain user engagement data. For instance, the automated interface optimization engine 130 may be configured with rules mapping one or more data sources (e.g., internal sources, external sources, user devices, and the like) to certain user engagement data. As such, via the rules, the automated interface optimization engine 130 may recognize that certain data sources may be more or less suitable for certain types of information. For instance, the automated interface optimization engine 130 may prescribe that a user's credit score be retrieved from an internal bank server. In another example, the automated interface optimization engine 130 may prescribe that a user's marital/relationship status be based on information retrieved from the first data source via sourcing engine 301, and/or that a user's employment status/history be based on information retrieved from the second data source via sourcing engine 301. In yet another example, the automated interface optimization engine 130 may prescribe that a user's current location be based on information retrieved from a user device 162 (e.g., a GPS sensor of a smartphone or wearable device, an IP address of a desktop computer, and the like).

The automated interface optimization engine 130 may prescribe a hierarchy of reliability. For instance, the automated interface optimization engine 130 may set a primary preference that a user's location be based on information retrieved from a GPS sensor of a user device 162, a secondary preference that the user's location be based on cell tower triangulation of a user device 162, and a tertiary preference that the user's location be based on a location associated with the user as received from the first data source via sourcing engine 301. As such, where a GPS sensor is installed on a user device and available to provide location data, the automated interface optimization engine 130 may ignore the location data provided by the secondary and tertiary preferences for location data.

In some cases, the automated interface optimization engine 130 may be required to derive predefined events based on the data collected from the various data sources. For instance, the automated interface optimization engine 130 may be required to detect a recent or upcoming life event relating to a user based on data collected from internal sources, external sources 150, and/or user devices 162. In some examples, the automated interface optimization engine 130 may be configured with rules mapping life events to data collected by the automated interface optimization engine 130. For example, the rules may provide that an upcoming marriage is likely where the collected data includes: (1) information retrieved from an internal bank server relating to a large transaction at a jewelry store; and/or (2) a relationship status of "In a Relationship" retrieved from one or more social media data sources. In another example, the rules may provide that recent home purchase is likely where the collected data includes: (1) information retrieved from an internal bank server relating to an approved mortgage loan application; and/or (2) an event retrieved from the first data source, where the event body includes the words "house warming." Alternatively, or additionally, automated interface optimization engine 130 may receive predefined events that have been detected by automated service initiation engine 124 (discussed above in reference to FIG. 5).

In step 608, the automated interface optimization engine 130 may calculate a rank for each of the products and services in the initial list of products and services. In some examples, the rank may be an absolute position of each product or service. In this example, the product or service to be displayed first would have a rank of one, the product or service to be displayed second would have a rank of two, the product or service to be displayed third would have a rank of three, and so forth. In another example, the rank may represent a relative score associated with each product or service. As such, the automated interface optimization engine 130 may sort the product or service in the initial set of product or service such that the product or service with the highest rank is in the first position, the product or service with the second-highest is in the second position, the product or service with the third-highest is in the third position, and so forth.

In some examples, the automated interface optimization engine 130 may calculate the rank for each product or service based on the analysis of the user engagement data and predefined events performed in step 606. For example, the rank score for a product or service will be higher if it corresponds one or more of the recent or upcoming predefined events identified by the automated interface optimization engine 130. More specifically, where the automated interface optimization engine 130 identified that a user is getting married in a few months, the rank score for a product or service relating to joint accounts and/or merging assets will likely be higher than a product or service relating to individual savings accounts. In another example, where the automated interface optimization engine 130 identified that a user has relocated to a new geographic location and that the user has a new employer, the rank score for a product or service relating to mortgage, home insurance, and/or renters insurance will likely be higher than a product or service relating to retirement accounts. In yet another example, the context score for a product and service will be higher if it is specific to the state in which the user resides, as indicated by the common data module stored in common data module repository 320 and analyzed by the automated interface optimization engine 130. In another example, automated interface optimization engine 130 may have determined, based on the tagged user engagement data received from the computing devices shown in FIG. 7, that the user has previously selected a first link relating to a first product when such a first link has been presented to the user in an online portal, and that the user has previously failed to select a second link relating to a second product when such a second link has been presented to a user in the online portal. In this example, the ranking of the first product is likely to be higher than the ranking of the second product.

In step 610, the automated interface optimization engine 130 may generate a subset of products and services by applying the ranks calculated for each of the products and services in the initial list of products and services in step 608. For instance, the automated interface optimization engine 130 may order the products and services in the initial list of products and services by rank. As described above, the rank calculated for a product and service may either be an absolute position or a relative score. Additionally or alternatively, the automated interface optimization engine 130 may eliminate products and services with ranks lower than a threshold amount. As such, the subset of products and services derived by applying the calculated ranks may include some or all of the products and services included in the initial list of products and services.

The interface rendering engine 135, in step 612, may then prepare the client-side instructions to display the subset of products and services. The prepared client-side instructions may be communicated to the user device 162 via the communication interface 140 of the user interaction optimization system 110. In response, the user device 162 may be configured to display the prepared client-side instructions via an application and/or browser. In some examples, in preparing the client-side instructions, the interface rendering engine 135 may adjust the presentation of the subset of products and services based on the user engagement data associated with the user. For instance, where the user engagement data indicates that the user is on a mobile device, and where full-text of information associated with a product or service is longer than a threshold amount, the interface rendering engine 135 may collapse, truncate, and/or suppress particular sections of the description of the product or service, to optimize the presentation of the products or services for small-screen displays. The collapsed, truncated, and/or suppressed content of the products or services may be displayed upon request by the user device 162. These modifications by the automated interface optimization engine 130 and the interface rendering engine 135 represent a technological improvement to the display of the user device 162 with a small-screen display by displaying information that is more likely to be pertinent to the user associated with the user device 162.

In some cases, where the user engagement data indicates that the user accesses the organization's services via multiple devices (e.g., a desktop computer and a mobile device, a laptop and a mobile device, a laptop and a wearable device, and so forth), the interface rendering engine 135 may generate multiple sets of client-side instructions including the subset of products or services. In these examples, the client-side instructions may be modified to take advantage of the screen size and screen resolution provided by a user device 162. For instance, where the user is currently in an active session via a mobile device, the interface rendering engine 135 may prepare the client-side instructions such that one or more sections of one or more products or services are collapsed, truncated, or suppressed, as described above. Additionally or alternatively, where the user engagement data indicates that the user has previously accessed the organization's services via a desktop computer, the interface rendering engine 135 may prepare the client-side instructions to take advantage of a faster network connection (e.g., by including interactive products or services, by including video content, and the like) and/or of a larger display size (e.g., including more products or services, expanding all sections of the products or services, and the like). In some examples, where the user engagement data indicates that the mobile device and the desktop computer are in close proximity to each other (e.g., within a threshold radius), and where the products or services selected for the user would be more suitably viewed via a faster network connection and/or on a larger display, the interface rendering engine 135 may issue a notification to the user device 162 of the same. As such, the user associated with the user device 162 may be provided an option to access the subset of products and services via an alternative device, even where the user is not currently engaged in an active session via the alternative device. The interface rendering engine 135 may then deliver the client-side instructions to display the subset of products and services to the alternative device instead of to the user device 162.

To continually improve the quality of products or services included in the subset of products or services, in step 614, the user interaction optimization system 110 (for example, automated interface optimization engine 130) may collect and analyze user engagement data with the products or services presented to the user device 162. The user engagement data may be stored in the interface optimization database 131 as historical user engagement data, and may be used by the user interaction optimization system 110 (e.g., by the automated interface optimization engine 130) to provide more contextually relevant products and services to subsequent users demonstrating similar life events and user engagement data. The tracking of the user engagement data with the products or services may be transmitted from the user device 162 to multi-platform API 132, or may be received by multi-platform API 132 from sourcing engine 301. In particular, the automated interface optimization engine 130 may analyze the historical user engagement data associated with previous users' interactions with the organization's services to make predictions about which products and services are likely to be of interest to the users. Further, the rules engine 126 may be configured to access and analyze the historical user engagement metrics to detect patterns in the data. As such, the rules engine 126 may generate one or more rules to reflect detected patterns in the historical user engagement metrics. For instance, the rules engine 126 may identify and store rules relating to certain user behaviors that indicate that the user is likely to be interested in a product or service. Automated interface optimization engine 130 may access these rules when determining which products and services to present to a user via the online portal.

One or more aspects of the disclosure may be embodied in computer-usable data or computer-executable instructions, such as in one or more modules, executed by one or more computers or other devices to perform the operations described herein. Generally, modules include routines, programs, objects, components, data structures, and the like that perform particular operations or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising:
   at least one processor;
   a communication interface; and
   memory storing computer-readable instructions that, when executed by the at least one processor, cause the system to:
   determine, by an automated service initiation engine, that a combination of a first value of a first common data field and a second value of a second common data field is indicative of a predefined event, wherein the first common data field and the second common data field have been flagged as trusted data fields by a rules engine, and wherein the first common data field has been flagged as a trusted data field by the rules engine based on an analysis comprising:
   assigning, by the rules engine, a preliminary score to the first common data field based on a first set of rules;
   calculating, by the rules engine, a first confidence level for the first common data field based on a second set of rules;
   determining, by the rules engine, whether the first confidence level is above a first threshold; and
   flagging, by the rules engine and responsive to determining that the first confidence level is above the first threshold, the first common data field as a trusted data field;
   calculate, by the automated service initiation engine and based on one or more rules from the rules engine, a confidence level for the predefined event;
   determine, by the automated service initiation engine, whether the confidence level for the predefined event is above a threshold;
   generate, by the automated service initiation engine and responsive to a determination that the confidence level for the predefined event is above the threshold, a set of operations, the set of operations comprising a first plurality of operations to be completed by a user;

transmit, by the automated service initiation engine, the set of operations to a user device associated with the user;

receive, by the automated service initiation engine and from the user device, a notification that the user has completed a first operation in the set of operations;

generate, by the automated service initiation engine and responsive to receiving the notification that the user has completed the first operation in the set of operations, an updated set of operations, the updated set of operations comprising a second plurality of operations to be completed by the user; and transmit, by the automated service initiation engine, the updated set of operations to the user device associated with the user.

2. The system of claim 1, wherein the computer-readable instructions, when executed by the at least one processor, further cause the system to:

initiate, by a sourcing engine, a first real-time data feed with a first data source;

initiate, by the sourcing engine, a second real-time data feed with a second data source;

receive, by the sourcing engine, a first field name and the first value, wherein the first value is associated with the first field name from the first real-time data feed; and receive, by the sourcing engine, a second field name and the second value, wherein the second value is associated with the second field name from the second real-time data feed.

3. The system of claim 2, wherein the computer-readable instructions, when executed by the at least one processor, further cause the system to:

send, by the sourcing engine, the first field name and the first value to a first conversion engine; and send, by the sourcing engine, the second field name and the second value to a second conversion engine.

4. The system of claim 3, wherein the computer-readable instructions, when executed by the at least one processor, further cause the system to:

map, by the first conversion engine, the first field name to the first common data field;

populate, by the first conversion engine and based on mapping the first field name to the first common data field, the first common data field with the first value;

map, by the second conversion engine, the second field name to the second common data field; and populate, by the second conversion engine and based on mapping the second field name to the second common data field, the second common data field with the second value.

5. The system of claim 1, wherein a first operation in the set of operations comprises a selectable Internet link to an online web portal.

6. A computer-assisted method of determining a set of operations to be transmitted to a user device, the computer-assisted method comprising:

determining, by an automated service initiation engine, that a combination of a first value of a first common data field and a second value of a second common data field is indicative of a predefined event, wherein the first common data field and the second common data field have been flagged as trusted data fields by a rules engine, and wherein the first common data field has been flagged as a trusted data field by the rules engine based on an analysis comprising:

assigning, by the rules engine, a preliminary score to the first common data field based on a first set of rules;

calculating, by the rules engine, a first confidence level for the first common data field based on a second set of rules;

determining, by the rules engine, whether the first confidence level is above a first threshold; and flagging, by the rules engine and responsive to determining that the first confidence level is above the first threshold, the first common data field as a trusted data field;

calculating, by the automated service initiation engine and based on one or more rules from the rules engine, a confidence level for the predefined event;

determining, by the automated service initiation engine, whether the confidence level for the predefined event is above a threshold;

generating, by the automated service initiation engine and responsive to a determination that the confidence level for the predefined event is above the threshold, a set of operations, the set of operations comprising a first plurality of operations to be completed by a user;

transmitting, by the automated service initiation engine, the set of operations to a user device associated with the user;

receiving, by the automated service initiation engine and from the user device, a notification that the user has completed a first operation in the set of operations;

generating, by the automated service initiation engine and responsive to receiving the notification that the user has completed the first operation in the set of operations, an updated set of operations, the updated set of operations comprising a second plurality of operations to be completed by the user; and transmitting, by the automated service initiation engine, the updated set of operations to the user device associated with the user.

7. The computer-assisted method of claim 6, further comprising:

initiating, by a sourcing engine, a first real-time data feed with a first data source;

initiating, by the sourcing engine, a second real-time data feed with a second data source;

receiving, by the sourcing engine, a first field name and the first value, wherein the first value is associated with the first field name from the first real-time data feed; and receiving, by the sourcing engine, a second field name and the second value, wherein the second value is associated with the second field name from the second real-time data feed.

8. The computer-assisted method of claim 7, further comprising:

transmitting, by the sourcing engine, the first field name and the first value to a first conversion engine; and transmitting, by the sourcing engine, the second field name and the second value to a second conversion engine.

9. The computer-assisted method of claim 8, further comprising:

mapping, by the first conversion engine, the first field name to the first common data field;

populating, by the first conversion engine and based on mapping the first field name to the first common data field, the first common data field with the first value;

mapping, by the second conversion engine, the second field name to the second common data field; and populating, by the second conversion engine and based on mapping the second field name to the second common data field, the second common data field with the second value.

10. The computer-assisted method of claim 6, wherein a first operation in the set of operations comprises a selectable Internet link to an online web portal.

11. One or more non-transitory computer-readable media storing instructions that, when executed by a computer system comprising at least one processor and memory, cause the computer system to:

determine, by an automated service initiation engine, that a combination of a first value of a first common data field and a second value of a second common data field is indicative of a predefined event, wherein the first common data field and the second common data field have been flagged as trusted data fields by a rules engine, and wherein the first common data field has been flagged as a trusted data field by the rules engine based on an analysis comprising:

assigning, by the rules engine, a preliminary score to the first common data field based on a first set of rules;

calculating, by the rules engine, a first confidence level for the first common data field based on a second set of rules;

determining, by the rules engine, whether the first confidence level is above a first threshold; and flagging, by the rules engine and responsive to determining that the first confidence level is above the first threshold, the first common data field as a trusted data field;

calculate, by the automated service initiation engine and based on one or more rules from the rules engine, a confidence level for the predefined event;

determine, by the automated service initiation engine, whether the confidence level for the predefined event is above a threshold;

generate, by the automated service initiation engine and responsive to a determination that the confidence level for the predefined event is above the threshold, a set of operations, the set of operations comprising a first plurality of operations to be completed by a user;

transmit, by the automated service initiation engine, the set of operations to a user device associated with the user;

receive, by the automated service initiation engine and from the user device, a notification that the user has completed a first operation in the set of operations;

generate, by the automated service initiation engine and responsive to receiving the notification that the user has completed the first operation in the set of operations, an updated set of operations, the updated set of operations comprising a second plurality of operations to be completed by the user; and transmit, by the automated service initiation engine, the updated set of operations to the user device associated with the user.

12. The one or more non-transitory computer-readable media of claim 11, wherein the instructions, when executed by the computer system, further cause the computer system to:

initiate, by a sourcing engine, a first real-time data feed with a first data source;

initiate, by the sourcing engine, a second real-time data feed with a second data source;

receive, by the sourcing engine, a first field name and the first value, wherein the first value is associated with the first field name from the first real-time data feed; and receive, by the sourcing engine, a second field name and the second value, wherein the second value is associated with the second field name from the second real-time data feed.

13. The one or more non-transitory computer-readable media of claim 12, wherein the instructions, when executed by the computer system, further cause the computer system to:

send, by the sourcing engine, the first field name and the first value to a first conversion engine;

send, by the sourcing engine, the second field name and the second value to a second conversion engine;

map, by the first conversion engine, the first field name to the first common data field;

populate, by the first conversion engine and based on mapping the first field name to the first common data field, the first common data field with the first value;

map, by the second conversion engine, the second field name to the second common data field; and populate, by the second conversion engine and based on mapping the second field name to the second common data field, the second common data field with the second value.

14. The one or more non-transitory computer-readable media of claim 11, wherein a first operation in the set of operations comprises a selectable Internet link to an online web portal.

* * * * *